(12) United States Patent
Yanai et al.

(10) Patent No.: US 10,514,490 B2
(45) Date of Patent: Dec. 24, 2019

(54) BACKLIGHT UNIT USED IN A LIQUID CRYSTAL DISPLAY DEVICE

(71) Applicant: FUJIFILM Corporation, Tokyo (JP)

(72) Inventors: Yujiro Yanai, Kanagawa (JP); Yukito Saitoh, Kanagawa (JP); Shuntaro Ibuki, Kanagawa (JP); Jun Takeda, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 178 days.

(21) Appl. No.: 15/723,746

(22) Filed: Oct. 3, 2017

(65) Prior Publication Data

US 2018/0039013 A1 Feb. 8, 2018

Related U.S. Application Data

(63) Continuation of application No. PCT/JP2016/062337, filed on Apr. 19, 2016.

(30) Foreign Application Priority Data

May 29, 2015 (JP) ................. 2015-110742

(51) Int. Cl.
*F21V 9/14* (2006.01)
*F21V 8/00* (2006.01)
*G02B 5/30* (2006.01)

(52) U.S. Cl.
CPC ......... *G02B 6/0056* (2013.01); *G02B 5/3025* (2013.01); *G02B 6/005* (2013.01); *G02B 6/0055* (2013.01)

(58) Field of Classification Search
CPC .. G02B 6/0055; G02B 6/0056; G02B 5/3025; G02B 27/285; G02F 1/133615; G02F 1/13362
See application file for complete search history.

(56) References Cited

U.S. PATENT DOCUMENTS 6,545,734 B2 * 4/2003 Cornelissen ......... G02B 6/0033
349/63
2002/0041348 A1 * 4/2002 Yokoyama ........ G02F 1/133603
349/61

(Continued)

FOREIGN PATENT DOCUMENTS

JP 2005-268201 A 9/2005
JP 2005-285388 A 10/2005

(Continued)

OTHER PUBLICATIONS

Office Action, issued by the Japanese Patent Office dated Oct. 30, 2018, in connection with Japanese Patent Application No. 2017-521730.

(Continued)

*Primary Examiner* — Alan B Cariaso
(74) *Attorney, Agent, or Firm* — Edwards Neils LLC; Jean C. Edwards, Esq.

(57) ABSTRACT

Provided is a backlight unit capable of causing light that has exited from a light guide plate to be incident to a liquid crystal panel with high efficiency. The object is achieved by providing the backlight unit including a light source; a light guide plate that causes light to be incident to through an edge face and to exit through one of principal surfaces; and an optical film disposed on a surface of the light guide plate, the surface being on the opposite side of the light exiting surface, in which the optical film has a plurality of reflective polarizing elements each having a curved surface, and/or a plurality of reflective polarizing elements each having an inclined surface that is inclined with respect to the direction of light propagation of the light guide plate.

10 Claims, 3 Drawing Sheets

(56) References Cited

U.S. PATENT DOCUMENTS

| | | |
|---|---|---|
| 2005/0219768 A1 | 10/2005 | Nakamura et al. |
| 2007/0014127 A1* | 1/2007 | Hara .................... G02B 6/005 |
| | | 362/611 |
| 2014/0240828 A1* | 8/2014 | Robinson .............. G02B 27/26 |
| | | 359/465 |

FOREIGN PATENT DOCUMENTS

| | | |
|---|---|---|
| JP | 2005-286201 A | 10/2005 |
| JP | 2014-174468 A | 9/2014 |
| WO | 2014/130860 A1 | 8/2014 |

OTHER PUBLICATIONS

International Search Report issued in PCT/JP2016/062337 dated Jul. 26, 2016.
Written Opinion issued in PCT/JP2016/062337 dated Jul. 26, 2016.
International Preliminary Report on Patentability completed by WIPO dated Dec. 14, 2017, in connection with International Patent Application No. PCT/JP2016/062337.
Office Action, issued by the State Intellectual Property Office dated Mar. 21, 2019 in connection with Chinese Patent Application No. 201680027870.5.

* cited by examiner

BACKLIGHT UNIT USED IN A LIQUID CRYSTAL DISPLAY DEVICE

CROSS-REFERENCE TO RELATED APPLICATIONS

This application is a Continuation of PCT International Application No. PCT/JP2016/062337 filed on Apr. 19, 2016, which was published under PCT Article 21(2) in Japanese, and which claims priority under 35 U.S.C. § 119(a) to Japanese Patent Application No. 2015-110742 filed on May 29, 2015. The above applications are hereby expressly incorporated by reference, in their entirety, into the present application.

BACKGROUND OF THE INVENTION

1. Field of the Invention

The present invention relates to a backlight unit used in a liquid crystal display device.

2. Description of the Related Art

Liquid crystal display devices (hereinafter, also referred to as LCD's) are image display devices that have low electric power consumption and are effective for space-saving, and the range of use applications thereof is extending every year. An example of liquid crystal display devices is configured to include a backlight unit, a backlight side polarizing plate, a liquid crystal panel, a viewer's side polarizing plate, and the like installed in this order.

Regarding the backlight unit, there is known a so-called edge-lighting type backlight unit having a light guide plate capable of propagating light incident through an edge face and causing the light to exit through a principal surface, and a light source causing light to be incident to an edge face of the light guide plate. Furthermore, on the light guide plate, a dot pattern or the like is formed on the surface on the opposite side of the light exiting surface, so that the light guide plate can guide propagating light to efficiently travel toward the exiting surface.

Such an edge-lighting type backlight unit is configured to include, in addition to the light guide plate and the light source described above as an example, a diffuser plate that diffuses the light exiting from the light guide plate and reduces any unevenness in the amount of light caused by the dot pattern; a prism that concentrates the light diffused by the diffuser plate to be directed to the backlight side polarizing plate; and the like.

Backlight units significantly affect the performance of LCD's, such as the luminance or visibility of images. In this regard, various suggestions have been made.

For example, JP2005-268201A describes an edge-lighting type backlight unit (planar light source apparatus), which has a light reflector unit for reflecting the light propagating in a light guide plate and causing the reflected light to exit through a light exiting surface, at a surface facing the light exiting surface of a light guide plate, this light reflector unit being positioned inside the light guide plate; and a directionality converting unit for enhancing the directionality of light incident to the light reflector unit, on the light source side of the light reflector unit.

The backlight unit described in JP2005-268201A having such a configuration can enhance the directionality of light that exits from the backlight unit and can promote, for example, enhancement of the viewing angle characteristics of LCD's and reduction of the number of backlight members.

However, in the flat panel display market of recent years, developments for electric power saving, definition enhancement, and color reproducibility enhancement are in progress for the purpose of improving the performance of LCD's. Particularly, small-sized devices such as tablet personal computers and smart phones are notably required to have characteristics such as electric power saving, high definition, and enhanced color reproducibility. Also for large-sized LCD's, development of the next-generation high-definition televisions (4K2K, European Broadcasting Union (EBU) ratio: 100% or higher) of the current TV standards (FHD, National Television System Committee (NTSC) ratio 72%≈EBU ratio 100%) is underway.

Therefore, there are further demands for electric power saving, definition enhancement, and enhancement of color reproducibility of LCD's.

SUMMARY OF THE INVENTION

In a case in which the definition of an LCD is increased, the pixel aperture ratios of various pixels (subpixels) are decreased, and the luminance of the displayed images is decreased. In order to prevent this, it is necessary to increase the efficiency of utilization of the light emitted by a backlight unit (backlight).

However, in an LCD, the light emitted by a backlight unit is converted to linearly polarized light using a backlight side polarizing plate and then is made to be incident to a liquid crystal panel, as described above. Therefore, at a time point at which the light has passed through the backlight side polarizing plate, the efficiency of light utilization is decreased, such as ideally to 50% and practically to about 40%.

Also, as described above, a conventional backlight unit has a diffuser plate for eliminating the dot pattern of the light exiting from a light guide plate, or a prism for concentrating light such that light is directed to a backlight side polarizing plate. Even in these members, light is reflected or scattered, and therefore, the efficiency of utilization of the light that has exited from a light guide plate is further decreased.

Thus, an object of the invention is to solve these problems of the technologies in the related art, and to provide a backlight unit that is used in LCD's and the like, the backlight unit capable of causing the light that has exited from a light guide plate to be incident to a liquid crystal panel with very high efficiency.

In order to achieve such an object, the backlight unit of the invention comprises a light source; a light guide plate that causes the light emitted by the light source to be incident through an edge face and propagates the light incident through the edge face to exit through one of principal surfaces; and an optical film disposed on a surface of the light guide plate, the surface being on the opposite principal surface side of the light exiting surface, in which the optical film has at least one of a plurality of reflective polarizing elements having a curved surface, or a plurality of reflective polarizing elements having an inclined surface that is inclined with respect to the direction of light propagation of the light guide plate.

In regard to such a backlight unit of the invention, it is preferable that the reflective polarizing element reflects circularly polarized light and the backlight unit has a λ/4 plate in the downstream of the light exit direction of the light exiting surface of the light guide plate.

Furthermore, it is preferable that the density of formation of the reflective polarizing elements increases as the reflective polarizing elements are separated apart from the light source in the direction of light propagation.

It is preferable that the backlight unit has an R-polarizing element reflecting red light, a G-polarizing element reflecting green light, and a B-polarizing element reflecting blue light as the reflective polarizing element.

It is preferable that the R-polarizing element, the G-polarizing element, and the B-polarizing element are provided at different positions in a direction orthogonally intersecting the surface direction of the light guide plate.

It is preferable that the R-polarizing element, the G-polarizing element, and the B-polarizing element are arranged in the surface direction of the optical film, adjacently to one another or separately apart from one another.

It is preferable that the reflective polarizing element has an R-polarizing layer reflecting red light, a G-polarizing layer reflecting green light, and a B-polarizing layer reflecting blue light, and the R-polarizing layer, the G-polarizing layer, and the B-polarizing layer are laminated.

It is preferable that the reflective polarizing element has an inclined surface that gradually approaches the light guide plate in a direction in which the inclined surface is separating apart from the light source in the direction of light propagation of the light guide plate.

It is preferable that the reflective polarizing element has a support having a convexity on the surface; and a reflective polarizing layer formed on the surface of the convexity.

It is preferable that the reflective polarizing element has a convex shape formed on the surface of a planar-shaped support.

It is preferable that the reflective polarizing element is a reflective polarizing layer having a convexity formed on the surface of a planar-shaped support.

According to the invention, there can be obtained a backlight unit capable of reducing the amount of light absorbed by a backlight side polarizing plate to a large extent and increasing the efficiency of utilization of the light exiting from a light guide plate to a large extent.

DESCRIPTION OF THE PREFERRED EMBODIMENTS

Hereinafter, the backlight unit of the invention will be described in detail based on the suitable examples illustrated in the attached drawings.

A numerical value range indicated using the symbol "~" in the present specification means a range including the numerical values described before and after the symbol "~" as the lower limit and the upper limit.

According to the present specification, unless particularly stated otherwise, for example, an angle such as "45°", "parallel", "perpendicular", or "orthogonal" means that the difference between the angle and the exact angle is in the range of less than 5°. The difference between the angle and the exact angle is preferably less than 4°, and more preferably less than 3°.

According to the present specification, the term "(meth)acrylate" is used to mean "any one or both of acrylate and methacrylate".

According to the present specification, the term "same" is construed to include an error range that is generally accepted in the technical field. According to the present specification, in a case in which terms such as "entirety", "all", "entire surface", and the like are used, these terms include error ranges that are generally acceptable in the technical field, except for the case of 100%, and these terms are construed to include, for example, the cases of 99% or higher, 95% or higher, or 90% or higher.

According to the present specification, visible light is light having a wavelength that is visible to human eyes in the spectrum of the electromagnetic waves, and represents light having a wavelength in the range of 380 nm to 780 nm. Non-visible light is light having a wavelength in the range of less than 380 nm or a wavelength in the range of greater than 780 nm.

Without being limited to this, light having a wavelength in the range of 420 to 490 nm in the spectrum of visible light is blue light, light having a wavelength in the range of 495 to 570 nm is green light, and light having a wavelength in the range of 620 to 750 nm is red light.

In the spectrum of infrared light, near-infrared light is electromagnetic waves having a wavelength in the range of 780 to 2,500 nm. Ultraviolet light is electromagnetic waves having a wavelength in the range of 10 to 380 nm.

Figure 1:
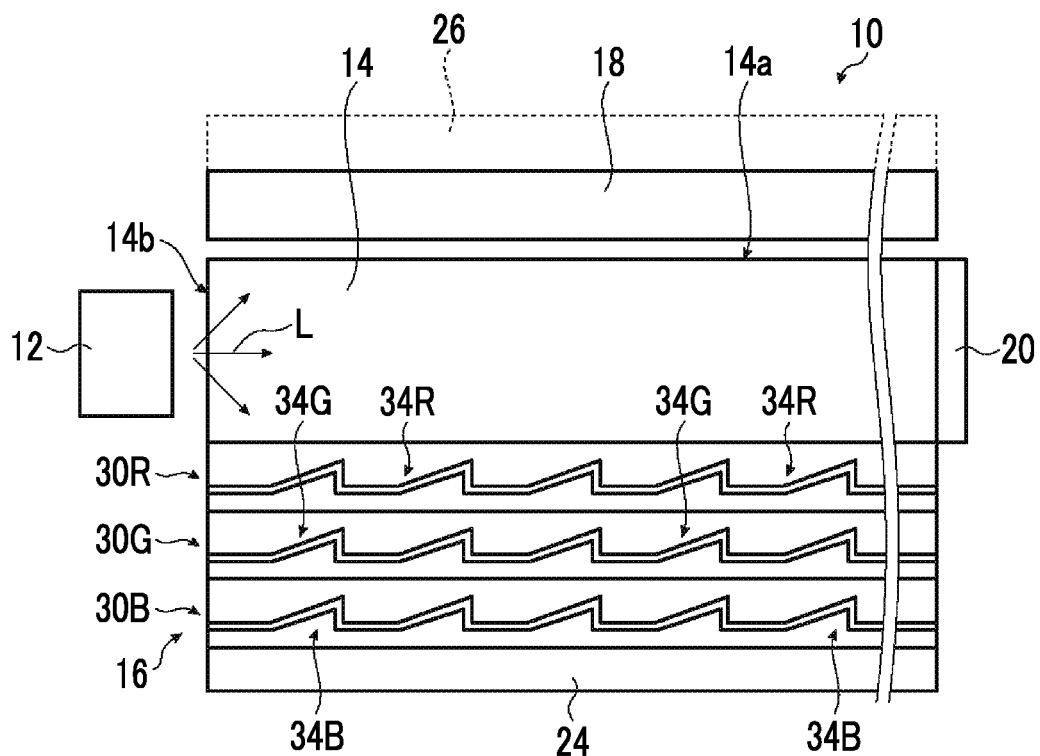
FIG. 1 is a diagram conceptually illustrating an example of a backlight unit of the invention.

FIG. 1 conceptually illustrates an example of the backlight unit of the invention.

The backlight unit 10 of the invention is mainly used in LCD's (liquid crystal display devices) and is intended for irradiating a liquid crystal panel with light for displaying an image (backlight) in an LCD.

The backlight unit 10 of the illustrated example is basically configured to include a light source 12, a light guide plate 14, an optical film 16, λ/4 plate 18, and reflector plates 20 and 24. The part indicated with broken lines in the diagram represents a backlight side polarizing plate 26 for linearly polarizing light that is incident to a liquid crystal panel (liquid crystal display panel), which is usually installed in an LCD.

The backlight unit 10 is basically similar to a known edge-lighting type (side lighting type, light guide plate type) backlight unit, except that the backlight unit 10 has the optical film 16 and the λ/4 plate 18.

The light source 12 causes light L for displaying an LCD to be incident to a light incident surface 14b, which is set as an edge face of the light guide plate 14.

In the backlight unit 10 of the invention, various known light sources that are used in edge-lighting type backlight units, such as a light source in which point light sources such as light emitting diodes (LED) are arranged along an edge face that serves as a light incident surface 14b of the light guide plate 14, a fluorescent lamp, and a laser light source, can be utilized as the light source 12.

The light guide plate 14 propagates light L incident from the light source 12 in the surface direction and causes light L to exit through the light exiting surface 14a, which is one of the principal surfaces (largest surfaces).

Regarding the light guide plate 14, various light guide plates used in known edge-lighting type backlight units, the light guide plates being formed from highly transparent resins such as polyethylene terephthalate, polypropylene, polycarbonate, polymethyl methacrylate, benzyl methacrylate, a MS resin, a cycloolefin polymer, and a cycloolefin copolymer, can be utilized.

The reflector plate 20 is intended to reflect light L that attempts to exit through an edge face of the light guide plate 14 and to thereby return the light L into the light guide plate 14. In the illustrated example, the reflector plate 20 is shown only on a surface facing the light incident surface 14b of the light guide plate 14; however, preferably, the reflector plate 20 is provided at all edge faces of the light guide plate 14, except for the light incident surface 14b.

Regarding the reflector plate 20, various known light reflector plates such as a metal foil (metal plate) such as an aluminum foil, a diffusion type reflector plate, and a mirror, can also be utilized.

Above the light guide plate (light exiting surface 14a side), a $\lambda/4$ plate 18 is disposed at a distance apart therefrom in the light exit direction.

The $\lambda/4$ plate 18 is a known $\lambda/4$ plate such as, for example, a $\lambda/4$ plate obtained by forming an oriented film on a support, and forming an optically anisotropic layer containing a liquid crystal compound on the oriented film, or a $\lambda/4$ plate obtained by laminating retardation films.

In regard to the backlight unit 10 of the illustrated example, the $\lambda/4$ plate 18 converts right-hand circularly polarized light Lr that has exited from the light guide plate 14, which will be described below, into linearly polarized light by means of the backlight side polarizing plate 26.

Below the light guide plate 14 (surface on the opposite side of the light exiting surface 14a), an optical film 16 is disposed to closely adhere to the lower surface of the light guide plate 14. Furthermore, the reflector plate 24 is disposed below the optical film 16 (opposite side of the light guide plate 14).

The reflector plate 24 is intended to increase the efficiency of utilization of the light emitted by the light source 12 by reflecting the light that has been transmitted through the optical film 16, to the optical film 16 side. Regarding this reflector plate 24, similarly to the reflector plate 20 described above, various known light reflector plates such as aluminum foil and a mirror can be utilized.

If necessary, the reflector plate may also be provided on the lateral faces of the optical film 16.

As described above, below the light guide plate 14, the optical film 16 is disposed to closely adhere to the lower surface of the light guide plate 14.

The optical film 16 has R-layer 30R coping with red light, G-layer 30G coping with green light, and B-layer 30B coping with blue light. In the following description, the red color is also called R, the green color is called G, and the blue color is called B.

The optical film 16 of the illustrated example is such that R-layer 30R, G-layer 30G, and B-layer 30B are laminated in this order from the light guide plate 14 side and are adhered. Furthermore, as the R-layer 30R is adhered to the surface on the opposite side of the light exiting surface 14a of the light guide plate 14, the optical film 16 is adhered to the light guide plate 14.

In regard to the optical film 16, the order of lamination of the R-layer 30R, the G-layer 30G, and the B-layer 30B is not particularly limited, and for example, the layers may also be laminated in the order of B-layer 30B, G-layer 30G, and R-layer 30R from the light guide plate 14 side.

The R-layer 30R is provided with a large number of R-polarizing elements 34R. An R-polarizing element 34R (its reflective polarizing layer 40) is a polarizing element that reflects R right-hand circularly polarized light (Lr) and transmits the other portion of light. Therefore, even with the same R light, R left-hand circularly polarized light (Ll) passes through the R-polarizing element 34R.

The G-layer 30G is provided with a large number of G-polarizing elements 34G. A G-polarizing element 34G (its reflective polarizing layer 40) is a polarizing element that reflects G right-hand circularly polarized light and transmits the other portion of light. Therefore, even with the same G light, G left-hand circularly polarized light passes through the G-polarizing element 34G.

The B-layer 30B is provided with a large number of B-polarizing elements 34B. A B-polarizing element 34B (its reflective polarizing layer 40) is a polarizing element that reflects B right-hand circularly polarized light and transmits the other portion of light. Therefore, even with the same B light, B left-hand circularly polarized light passes through the B-polarizing element 34B.

That is, in the example illustrated in FIG. 1, the R-polarizing element 34R, the G-polarizing element 34G, and the B-polarizing element 34B are provided at different positions in a direction orthogonally intersecting the surface direction of the light guide plate 14 in the optical film 16. That is, the R-polarizing element 34R, the G-polarizing element 34G, and the B-polarizing element 34B are provided in a state of being laminated separately apart from each other.

According to the invention, the reflective polarizing element is not limited to an element that reflects right-hand circularly polarized light and transmits left-hand circularly polarized light, and an element that reflects left-hand circularly polarized light and transmits right-hand circularly polarized light may also be used.

The R-layer 30R, G-layer 30G, and B-layer 30B basically have the same configuration and differ only in the color of the reflected light.

Therefore, the following explanation is given on the R-layer 30R as a representative example, and with regard to the G-layer 30G and the B-layer 30B, differences will be mainly explained.

Figure 2:
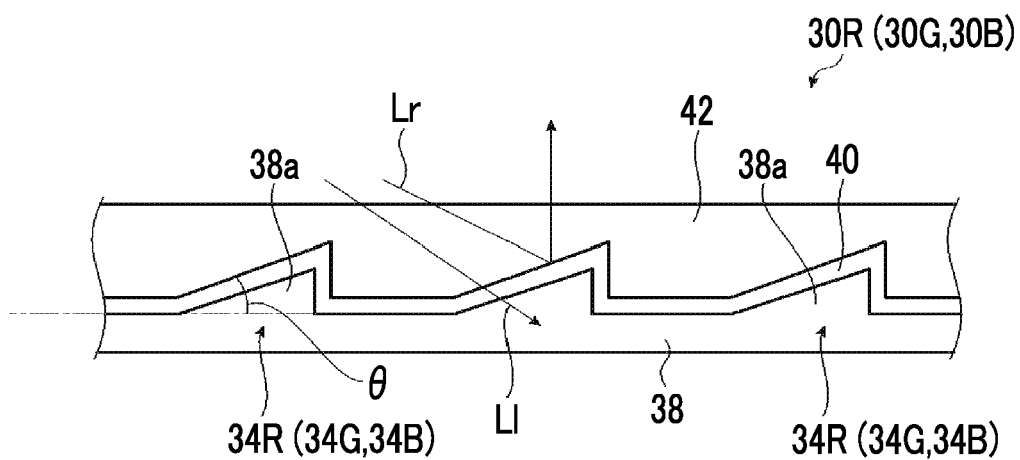
FIG. 2 is a conceptual diagram for explaining a reflective polarizing element in the backlight unit illustrated in FIG. 1.

FIG. 2 conceptually illustrates the R-layer 30R.

The R-layer 30R (G-layer 30G or B-layer 30B) is configured to include a support 38, a reflective polarizing layer 40, and an overcoat 42.

The support 38 supports the reflective polarizing layer 40. In the illustrated example, the support 38 is basically a sheet-like object having a surface that is parallel to the light exiting surface of the light guide plate 14. That is, the support 38 has a surface that is parallel to the direction of light propagation by the light guide plate 14.

The support 38 preferably has a low light reflectance for the wavelength at which the reflective polarizing layer 40 reflects light, and more preferably does not contain a material that reflects light at the wavelength at which the reflective polarizing layer 40 reflects light.

It is preferable that the support 38 is transparent to the visible light region. The support 38 may be colored; however, it is preferable that the support 38 is not colored or is colored to a low extent. It is preferable that the support 38 has a refractive index of about 1.2 to 2.0, and more preferably about 1.4 to 1.8.

The thickness of the support 38 (thickness excluding the convexities 38a) may be selected according to the usage, and is not particularly limited; however, the thickness may be about 5 to 1,000 µm, preferably 10 to 250 µm, and more preferably 15 to 150 µm.

The support 38 has a large number of convexities 38a on the surface on the light guide plate 14 side.

In the illustrated example, a convexity 38a has a right-angled triangle-shaped cross-section and is formed such that the surface adjoining the right angle is brought to the surface side of the support 38. The convexity 38a is formed such that the surface that does not adjoin the right angle gradually approaches the light guide plate 14 while facing toward the direction in which the surface is separating apart from the light source 12 in the direction of light propagation of the light guide plate 14. That is, each of the convexities 38a of the support 38 has an inclined surface that is inclined to the direction of light propagation by the light guide plate 14, the inclined surface gradually approaching the light guide plate 14 toward a direction in which the inclined surface is separating apart from the light source 12.

The support 38 may be a single layer or a multilayer. Examples of the support 38 in the case of being a single layer include glass, triacetyl cellulose (TAC), polyethylene terephthalate (PET), polycarbonate, polyvinyl chloride, acrylic, and a polyolefin; however, from the viewpoint of maintaining the polarized state of reflected light, glass, triacetyl cellulose, acrylic, and the like, which have low birefringence, are preferred. Examples of the support 38 in the case of being a multilayer include a support that includes any one of the examples of the support 38 in the case of being a single layer and is provided with other layers on the surface of the support.

In regard to the R-layer 30R, G-layer 30G, and B-layer 30B, the forming material and/or thickness of the support 38 may be identical with or different from each other.

In a case in which the reflective polarizing layer 40 that will be described later is formed using a liquid crystal material, it is preferable that the support 38 has an oriented film on the surface. That is, in a case in which the reflective polarizing layer 40 is formed using a liquid crystal material, it is preferable that a support 38 having an oriented film on the surface is used, and a reflective polarizing layer 40 is formed by applying a coating liquid on the surface of the oriented film.

It is preferable that the oriented film is formed by subjecting a polymer to a rubbing treatment.

Examples of the polymer include a methacrylate copolymer, a styrene-based copolymer, a polyolefin, polyvinyl alcohol, a modified polyvinyl alcohol, poly(N-methylolacrylamide), a polyester, a polyimide, a vinyl acetate copolymer, carboxymethyl cellulose, and a polycarbonate, as described in paragraph [0022] of JP1996-338913A (JP-H08-338913A). A silane coupling agent can also be used as the polymer. Regarding the polymer, a water-soluble polymer (for example, poly(N-methylolacrylamide), carboxymethyl cellulose, gelatin, polyvinyl alcohol, or a modified polyvinyl alcohol) is preferred; gelatin, polyvinyl alcohol, and a modified polyvinyl alcohol are more preferred, and polyvinyl alcohol and a modified polyvinyl alcohol are most preferred.

For the rubbing treatment, a treatment method that is widely employed as a liquid crystal orientation treatment process for LCD's can be applied. That is, a method of obtaining orientation by rubbing the surface of the oriented film in a constant direction using paper, gauze, felt, rubber, nylon, polyester fibers, or the like, can be used. Generally, the rubbing treatment is carried out by performing rubbing several times using a fabric produced by averagely implanting fibers having a uniform length and a uniform thickness, or the like.

A composition that forms the reflective polarizing layer 40 that will be described below is applied on the rubbing-treated surface of the oriented film, and then the molecules of the liquid crystalline compound are oriented. Subsequently, the reflective polarizing layer 40 can be formed by, if necessary, reacting the oriented film polymer with the polyfunctional monomer included in the optically anisotropic layer, or crosslinking the oriented film polymer using a crosslinking agent.

The film thickness of the oriented film is preferably in the range of 0.1 to 10 µm.

In regard to the R-layer 30R, G layer 30G, and B-layer 30B, the forming material and/or thickness of the oriented film may be identical with or different from each other.

On the support 38, a reflective polarizing layer 40 is formed.

The reflective polarizing layer 40 is in the form of a layer having a uniform thickness and covering the surface of the support 38.

In the R-layer 30R (G-layer 30G or B-layer 30B), the R-polarizing element 34R (G-polarizing element 34G or B-polarizing element 34B) comprises the convexities 38a of the support 38, and the reflective polarizing layer 40 on these convexities 38a.

The reflective polarizing layer 40 is a layer that reflects right-hand circularly polarized light Lr of R (G or B) and transmits the other portion of light. Therefore, even from the light of the same color, the reflective polarizing layer 40 transmits left-hand circularly polarized light Ll.

Such a reflective polarizing layer 40 may be formed using, for example, a liquid crystal material having the cholesteric structure. The regulation of the wavelength of light at which the reflective polarizing layer 40 shows selective reflectivity, that is, which among R light, G light and B light the reflective polarizing layer 40 would reflect, can be determined by regulating the helix pitch in the cholesteric structure of the liquid crystal material that forms the reflective polarizing layer 40. Furthermore, in the liquid crystal material that forms the reflective polarizing layer 40, since the helical axis direction of the cholesteric structure is controlled as described below, and therefore, incidence rays are not only regularly reflected, but are also reflected in various directions.

(Cholesteric Structure)

It is known that a cholesteric structure exhibits selective reflectivity at a particular wavelength. The central wavelength λ of selective reflection is dependent on the pitch of the helical structure (=period of the helix) in the cholesteric structure, and conforms to the relation between the average refractive index n of the cholesteric liquid crystal and $\lambda = n \times P$. Therefore, the selective reflection wavelength can be regulated by regulating the pitch of this helical structure. Since the pitch of the cholesteric structure is dependent on the type of the chiral agent used together with the polymerizable liquid crystal compound at the time of forming the reflective polarizing layer 40, or on the concentration of addition of the chiral agent, a desired pitch can be obtained by regulating these. In regard to the regulation of pitch, a detailed description is given in Fuji Film Research & Development No. 50 (2005), pp. 60 to 63. In regard to the measurement method for the sense or pitch of a helix, the methods described in "Ekisho Kagaku Jikken Nyumon (Introduction to Experimentation in Liquid Crystal Chemistry)", edited by Japanese Liquid Crystal Society, Sigma Publishing Co., Ltd., published in 2007, p. 46; and "Ekisho Binran (Liquid Crystal Handbook)", Editorial Committee for Liquid Crystal Handbook, Maruzen Co., Ltd., p. 196, can be used.

The cholesteric structure gives a stripe pattern of bright parts and dark parts in a cross-sectional view of the reflective polarizing layer 40 observed by scanning electron microscope (SEM). Two bright parts and two dark parts of this stripe pattern correspond to one helix pitch. From this, the pitch can be measured from a SEM cross-sectional view. The normal line of the various lines in the stripe pattern is the helical axis direction.

Reflected light of a cholesteric structure is circularly polarized light. That is, as described above, reflected light of the reflective polarizing layer 40 in the optical film 16 becomes circularly polarized light. Whether the reflected light is right-hand circularly polarized light or left-hand circularly polarized light depends on the twisted direction of the helix in the cholesteric structure. Selective reflection by a cholesteric liquid crystal is such that in a case in which the twisted direction of the helix of the cholesteric liquid crystal is right-handed, the cholesteric liquid crystal reflects right-hand circularly polarized light, and in a case in which the twisted direction of the helix is left-handed, the cholesteric liquid crystal reflects left-hand circularly polarized light. In the illustrated example, the cholesteric liquid crystal reflects right-hand circularly polarized light as described above.

In the invention, any of a cholesteric liquid crystal having right-hand twist and a cholesteric liquid crystal having left-hand twist may be used for the reflective polarizing layer 40. Alternatively, it is also preferable that the direction of circularly polarized light is selected to be the same as the direction of circularly polarized light of the light emitted by a light source that is used in combination.

The direction of revolution of the cholesteric crystalline phase can be regulated by the type of the liquid crystal compound or the type of the chiral agent that is added.

Regarding the half-width $\Delta\lambda$ (nm) of the selective reflection band (circularly polarized light reflection band) showing selective reflection, $\Delta\lambda$ is dependent on the birefringence $\Delta n$ and the pitch P of the liquid crystal compound, and conforms to the relation: $\Delta\lambda=\Delta n \times P$. Therefore, control of the width of the selective reflection band can be carried out by regulating $\Delta n$. The regulation of $\Delta n$ can be carried out by regulating the type or the mixing ratio of the polymerizable liquid crystal compound, or by controlling the temperature at the time of fixing the orientation.

The half-width of the reflection wavelength range is regulated according to, for example, the performance required from the backlight unit 10. The half-width of the reflection wavelength range may be, for example, 10 to 500 nm, and preferably 25 to 100 nm.

(Method for Producing Cholesteric Structure)

The cholesteric structure can be obtained by fixing a cholesteric liquid crystalline phase. The structure obtained by fixing the cholesteric liquid crystalline phase may be any structure in which the orientation of the liquid crystal compound constituting the cholesteric liquid crystalline phase is maintained, and typically, a structure obtained by bringing a polymerizable liquid crystal compound into an orientation state of the cholesteric liquid crystalline phase, polymerizing and curing the polymerizable liquid crystal compound by ultraviolet irradiation, heating or the like, forming a non-fluid layer, and at the same time, changing the layer into a state in which there is no change in the form of orientation caused by an external field or an external force, is desirable. Meanwhile, in regard to the structure obtained by fixing a cholesteric liquid crystalline phase, it is sufficient as long as the optical properties of the cholesteric liquid crystalline phase are maintained, and it is acceptable that the liquid crystal compound already does not show liquid crystallinity in that structure. For example, the polymerizable liquid crystal compound may have already lost liquid crystallinity as a result of being macromolecularized by a curing reaction.

Regarding the material used for forming the reflective polarizing layer 40 (reflective polarizing element) having a cholesteric structure, a liquid crystal composition including a liquid crystal compound, or the like may be used. The liquid crystal compound is preferably a polymerizable liquid crystal compound.

The liquid crystal composition including the polymerizable liquid crystal compound further includes a surfactant. The liquid crystal composition may further include a chiral agent and a polymerization initiator.

—Polymerizable Liquid Crystal Compound—

The polymerizable liquid crystal compound may be a rod-shaped liquid crystal compound or a disc-shaped liquid crystal compound; however, a rod-shaped liquid crystal compound is preferred.

Examples of the rod-shaped polymerizable liquid crystal compound that forms the cholesteric liquid crystal layer include rod-shaped nematic liquid crystal compounds. Regarding the rod-shaped nematic liquid crystal compounds, an azomethine compound, an azoxy compound, a cyanobiphenyl compound, a cyanophenyl ester compound, a benzoic acid ester compound, a cyclohexane carboxylic acid phenyl ester compound, a cyanophenyl cyclohexane compound, a cyano-substituted phenylpyrimidine compound, an alkoxy-substituted phenylpyrimidine compound, a phenyldioxane compound, a tolane compound, and an alkenylcyclohexylbenzonitrile compound are preferably used. Not only low-molecular weight liquid crystal compounds but also polymeric liquid crystal compounds can be used.

A polymerizable liquid crystal compound is obtained by introducing a polymerizable group into a liquid crystal compound. Examples of the polymerizable group include an unsaturated polymerizable group, an epoxy group, and an aziridinyl group, and an unsaturated polymerizable group is preferred, while an ethylenically unsaturated polymerizable group is particularly preferred. A polymerizable group can be introduced into the molecules of a liquid crystal compound by various methods. The number of polymerizable groups possessed by a polymerizable liquid crystal compound is preferably 1 to 6, and more preferably 1 to 3. Examples of the polymerizable liquid crystal compound include the compounds described in Makromol. Chem., Vol. 190, p. 2255 (1989); Advanced Materials, Vol. 5, p. 107 (1993); U.S. Pat. Nos. 4,683,327A, 5,622,648A, 5,770,107A; WO95/22586A, WO95/24455A, WO97/00600A, WO98/23580A, WO98/52905A; JP1989-272551A (JP-H01-272551A), JP1994-16616A (JP-H106-16616A), JP1995-110469A (JP-H07-110469A), JP1999-80081A (JP-H11-80081A), and JP2001-328973A. Two or more kinds of polymerizable liquid crystal compounds may also be used in combination. In a case in which two or more kinds of polymerizable liquid crystal compounds are used in combination, the orientation temperature can be lowered.

Specific examples of the polymerizable liquid crystal compound include compounds represented by Formulae (1) to (11).

(1)
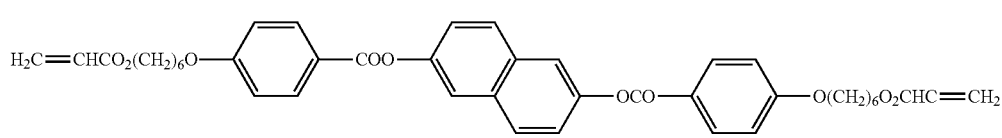

(2)
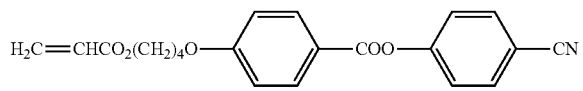

(3)

(4)

(5)

(6)
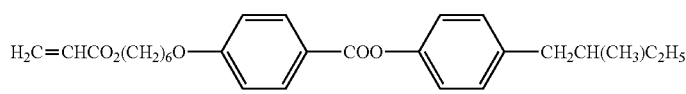

(7)
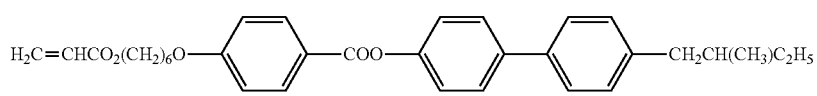

(8)
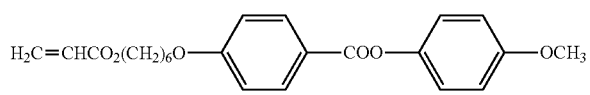

(9)
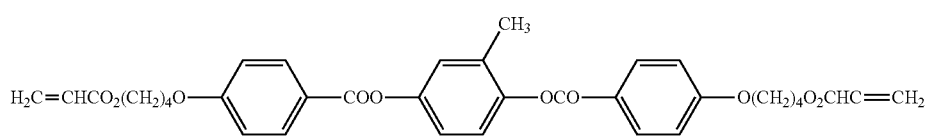

(10)
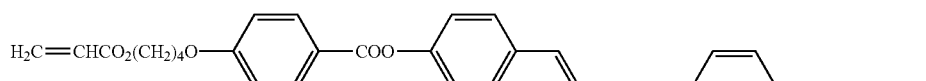

(11)
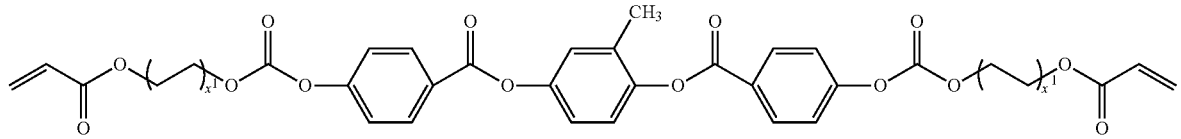

[wherein in Compound (11), $X^1$ represents 2 to 5 (integer).]

Regarding other polymerizable liquid crystal compounds, the cyclic organopolysiloxane compounds having a cholesteric liquid crystalline phase, which are disclosed in JP1982-165480A (JP-S57-165480A), and the like can be used. Furthermore, regarding the above-mentioned polymeric liquid crystal compounds, a polymer in which a mesogenic group exhibiting liquid crystallinity has been introduced into a position in the main chain, a side chain, or both the main chain and a side chain; a polymeric cholesteric liquid crystal having a cholesteryl group introduced into a side chain; the liquid crystalline polymer disclosed in JP1997-133810A (JP-H09-133810A); the liquid crystalline polymer disclosed in JP1999-293252A (JP-H11-293252A); and the like can be used.

Furthermore, the amount of addition of the polymerizable liquid crystal compound in the liquid crystal composition is preferably 75% to 99.9% by mass, more preferably 80% to 99% by mass, and particularly preferably 85% to 90% by mass, with respect to the solid content mass (mass excluding the solvent) of the liquid crystal composition.

13

—Surfactant—

The inventors of the present invention found that by adding a surfactant to the liquid crystal composition used at the time of forming the reflective polarizing layer 40, the polymerizable liquid crystal compound is oriented horizontally on the side of the interface with air at the time of forming the reflective polarizing layer 40, and a reflective polarizing layer 40 having the helical axis direction controlled as explained above may be obtained. Generally, for the formation of the reflective polarizing layer 40, there is a need to prevent the surface tension from lowering, in order to maintain the liquid droplet shape at the time of printing. Therefore, it was surprising to find that a reflective polarizing layer 40 can be formed even if a surfactant is added, and a reflective polarizing layer 40 having a superior retroreflective ability in multiple directions is obtained.

Regarding the surfactant, a compound that can function as an orientation controlling agent capable of contributing to obtain a cholesteric structure with planar orientation stably or rapidly, is preferred. Examples of the surfactant include a silicone-based surfactant and a fluorine-based surfactant, and a fluorine-based surfactant is preferred.

Examples of the surfactant include the compounds described in paragraphs [0082] to [0090] of JP2014-119605A, the compounds described in paragraphs [0031] to [0034] of JP2012-203237A, the compounds listed as examples in paragraphs [0092] and [0093] of JP2005-99248A, the compounds listed as examples in paragraphs [0076] to [0078] and [0082] to [0085] of JP2002-129162A, and the fluoro(meth)acrylate-based polymers described in paragraphs [0018] to [0043] of JP2007-272185A.

Regarding the horizontal orientation agent, one kind of agent may be used alone, or two or more kinds of agents may be used in combination.

Regarding the fluorine-based surfactant, a compound represented by General Formula (I) described in paragraphs [0082] to [0090] of JP2014-119605A is particularly preferred.

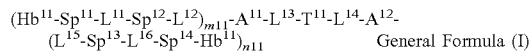

$$(Hb^{11}\text{-}Sp^{11}\text{-}L^{11}\text{-}Sp^{12}\text{-}L^{12})_{m11}\text{-}A^{11}\text{-}L^{13}\text{-}T^{11}\text{-}L^{14}\text{-}A^{12}\text{-}(L^{15}\text{-}Sp^{13}\text{-}L^{16}\text{-}Sp^{14}\text{-}Hb^{11})_{n11}$$ General Formula (I)

In General Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (wherein R in General Formula (I) represents a hydrogen atom or an alkyl group having 1 to 6 carbon atoms). —NRCO— and —CONR— have an effect of lowering solubility, and since there is a tendency that the haze value increases at the time of producing the reflective polarizing layer 40, —O—, —S—, —CO—, —COO—, —OCO—, —COS—, and —SCO— are more preferred. From the viewpoint of the stability of the compound, —O—, —CO—, —COO—, and —OCO— are even more preferred. The alkyl group represented by R may be linear or branched. The number of carbon atoms is more preferably 1 to 3, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and even more preferably a single bond or an alkylene group having 1 to 4 carbon atoms. However, a hydrogen atom of the alkylene group may be substituted with a fluorine atom. The alkylene group may be branched or not branched; however, a linear alkylene group without branching is preferred. From the viewpoint of synthesis, it is preferable that $Sp^{11}$ and $Sp^{14}$ are identical, while $Sp^{12}$ and $Sp^{13}$ are identical.

$A^{11}$ and $A^{12}$ represent monovalent to tetravalent aromatic hydrocarbon groups. The number of carbon atoms of the aromatic hydrocarbon group is preferably 6 to 22, more preferably 6 to 14, even more preferably 6 to 10, and still more preferably 6. The aromatic hydrocarbon group represented by $A^{11}$ or $A^{12}$ may have a substituent. Examples of such a substituent include an alkyl group having 1 to 8 carbon atoms, an alkoxy group, a halogen atom, a cyano group, or an ester group. In regard to the explanation and preferred ranges for these groups, the description corresponding to that for T given below may be referred to. Examples of a substituent for the aromatic hydrocarbon group represented by $A^{11}$ or $A^{12}$ include a methyl group, an ethyl group, a methoxy group, an ethoxy group, a bromine atom, a chlorine atom, and a cyano group. Molecules having many perfluoroalkyl moieties in the molecule can orient a liquid crystal even with a small amount of addition of the molecules, and this leads to a decrease in the haze value. Thus, $A^{11}$ and $A^{12}$ are preferably tetravalent so that the molecules may have many perfluoroalkyl groups. From the viewpoint of synthesis, it is preferable that $A^{11}$ and $A^{12}$ are identical.

It is preferable that $T^{11}$ represents a divalent group represented by the following:

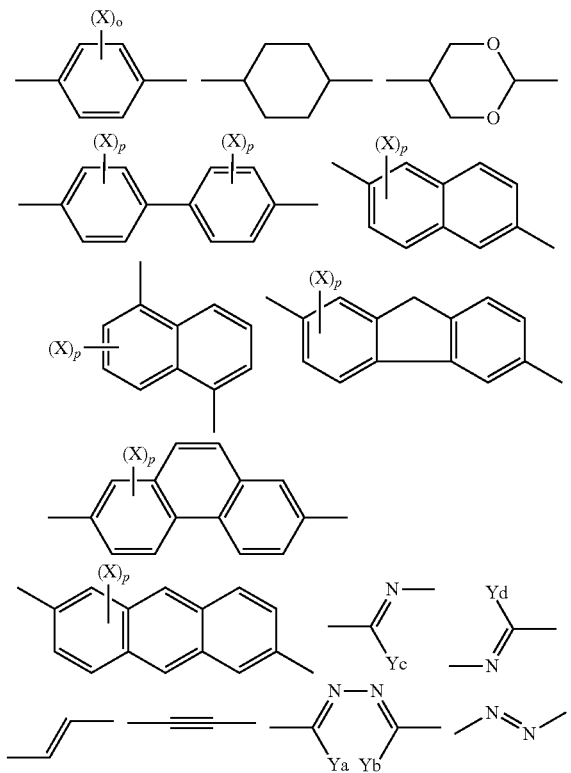

or a divalent heterocyclic group (wherein X included in $T^{11}$ represents an alkyl group having 1 to 8 carbon atoms, an alkoxy group, a halogen atom, a cyano group, or an ester group; and Ya, Yb, Yc, and Yd each independently represent a hydrogen atom or an alkyl group having 1 to 4 carbon atoms), more preferably

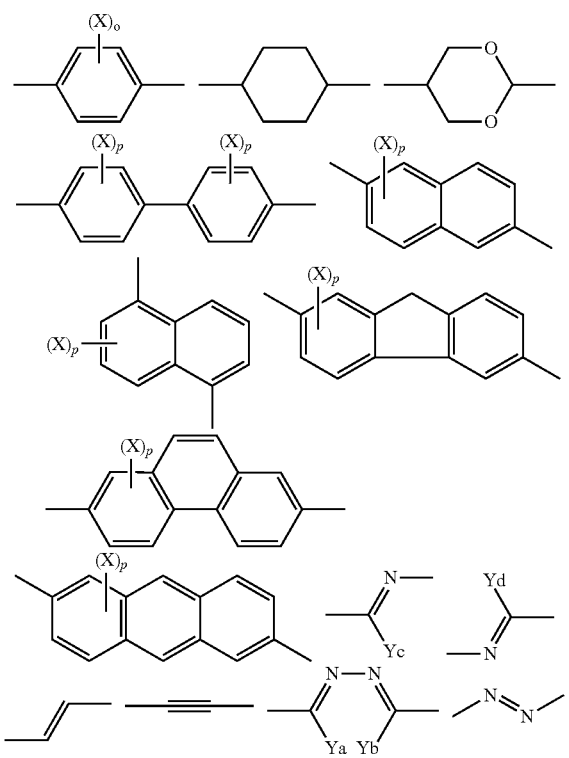

even more preferably

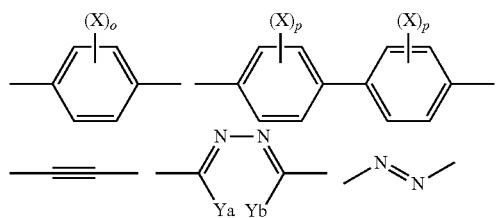

and particularly preferably

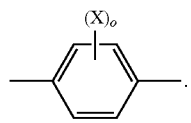.

The number of carbon atoms of the alkyl group that can be adopted by X included in $T^{11}$ is 1 to 8, preferably 1 to 5, and more preferably 1 to 3. The alkyl group may be any of a linear group, a branched group, or a cyclic group, and a linear group or a branched group is preferred. Preferred examples of the alkyl group include a methyl group, an ethyl group, an n-propyl group, and an isopropyl group, and among them, a methyl group is preferred. Regarding the alkyl moiety of the alkoxy group that can be adopted by X included in $T^{11}$, the explanation and preferred ranges for the alkyl group that can be adopted by X included in $T^{11}$ may be referred to. Examples of the halogen atom that can be adopted by X included in $T^{11}$ include a fluorine atom, a chlorine atom, a bromine atom, and an iodine atom, and a chlorine atom and a bromine atom are preferred. Examples of the ester group that can be adopted by X included in $T^{11}$ include a group represented by R'COO—. R' may be an alkyl group having 1 to 8 carbon atoms. Regarding the explanation and a preferred range for the alkyl group that can be adopted by R', the explanation and preferred range for the alkyl group that can be adopted by X included in $T^{11}$ can be referred to. Specific examples of the ester include $CH_3COO$— and $C_2H_5COO$—. The alkyl group having 1 to 4 carbon atoms that can be adopted by Ya, Yb, Yc, or Yd may be linear or branched. Examples thereof include a methyl group, an ethyl group, an n-propyl group, and an isopropyl group.

It is preferable that the divalent aromatic heterocyclic group has a 5-membered, 6-membered, or 7-membered heterocyclic ring. A 5-membered ring or a 6-membered ring is more preferred, and a 6-membered ring is most preferred. Preferred examples of the heteroatom that constitutes the heterocyclic ring include a nitrogen atom, an oxygen atom, and a sulfur atom. The heterocyclic ring is preferably an aromatic heterocyclic ring. The aromatic heterocyclic ring is generally an unsaturated heterocyclic ring. An unsaturated heterocyclic ring having the largest number of double bonds is more preferred. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. A divalent heterocyclic group may have a substituent. In regard to the explanation and preferred ranges for the examples of such a substituent, the explanation and description concerning substituents that can be adopted by a monovalent to tetravalent aromatic hydrocarbon of $A^1$ and $A^2$ can be referred to.

$Hb^{11}$ represents a perfluoroalkyl group having 2 to 30 carbon atoms, more preferably a perfluoroalkyl group having 3 to 20 carbon atoms, and even more preferably a perfluoroalkyl group having 3 to 10 carbon atoms. The perfluoroalkyl group may be any of a linear group, a branched group, and a cyclic group; however, a linear group or a branched group is preferred, and a linear group is more preferred.

m11 and n11 each independently represent 0 to 3, and m11+n11≥1. In this case, a plurality of the structures shown in the parentheses may be identical with or different from each other; however, it is preferable that the structures are identical with each other. m11 and n11 in General Formula (I) are determined according to the valency of $A^{11}$ and $A^{12}$, and preferred ranges of m11 and n11 are also determined according to the preferred ranges of the valency of $A^{11}$ and $A^{12}$.

o and p included in $T^{11}$ each independently represent an integer of 0 or greater, and in a case in which o and p are each 2 or greater, a plurality of X's may be identical with or different from each other. o included in $T^{11}$ is preferably 1 or 2. p included in $T^{11}$ is preferably any integer from 1 to 4, and more preferably 1 or 2.

The compound represented by General Formula (I) may be a compound having a symmetric molecular structure, or a compound having a non-symmetric molecular structure. The term symmetry as used herein means that the symmetry corresponds to at least one of point symmetry, line symmetry, or rotational symmetry, and the term non-symmetry means that the symmetry does not correspond to any of point symmetry, line symmetry, and rotational symmetry.

The compound represented by General Formula (I) is a compound combining the perfluoroalkyl group ($Hb^{11}$) mentioned above, linking groups such as $(-Sp^{11}-L^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$, and preferably T, which is a divalent group having an excluded volume effect. It is preferable that the two perfluoroalkyl groups ($Hb^{11}$) existing in the molecule are identical with each other, and it is also preferable that the linking groups existing in the molecule, $(-Sp^{11}-L^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$ are identical with each other. It is preferable that terminal $Hb^{11}-Sp^{11}-L^{11}-Sp^{12}-$ and $-Sp^{13}-L^{16}-Sp^{14}-Hb^{11}$ are groups represented by any of the following general formulae.

$(C_aF_{2a+1})$—$(C_bH_{2b})$—

$(C_aF_{2a+1})$—$(C_bH_{2b})$—O—$(C_rH_{2r})$—

$(C_aF_{2a+1})$—$(C_bH_{2b})$—COO—$(C_rH_{2r})$—

$(C_aF_{2a+1})$—$(C_bH_{2b})$—OCO—$(C_rH_{2r})$—

In regard to the above formulae, a is preferably 2 to 30, more preferably 3 to 20, and even more preferably 3 to 10. b is preferably 0 to 20, more preferably 0 to 10, and even more preferably 0 to 5. a+b is 3 to 30. r is preferably 1 to 10, and more preferably 1 to 4.

Terminal $Hb^{11}-Sp^{11}-L^{11}-Sp^{12}-L^{12}-$ and $-L^{15}-Sp^{13}-L^{16}-Sp^{14}-Hb^{11}$ in General Formula (I) are each preferably groups represented by any one of the following general formulae.

$(C_aF_{2a+1})$—$(C_bH_{2b})$—O—

$(C_aF_{2a+1})$—$(C_bH_{2b})$—COO—

$(C_aF_{2a+1})$—$(C_bH_{2b})$—O—$(C_rH_{2r})$—O—

$(C_aF_{2a+1})$—$(C_bH_{2b})$—COO—$(C_rH_{2r})$—COO—

$(C_aF_{2a+1})$—$(C_bH_{2b})$—OCO—$(C_rH_{2r})$—COO—

The definitions for a, b and r in the above formulae are the same as the definitions given right above.

The amount of addition of the surfactant in the liquid crystal composition is preferably 0.01% to 10% by mass, more preferably 0.01% to 5% by mass, and particularly preferably 0.02% to 1% by mass, with respect to the total mass of the polymerizable liquid crystal compound.

—Chiral Agent (Optically Active Compound)—

A chiral agent has a function of inducing a helical structure of the cholesteric liquid crystalline phase. Since chiral agents have different twisted directions of the helix or the helix pitch induced by different compounds, the chiral agent may be selected according to the purpose.

The chiral agent is not particularly limited, and known compounds (for example, described in Liquid Crystal Device Handbook, Chapter 3, Section 4-3, Chiral agents for TN and STN, p. 199, edited by $142^{nd}$ Committee for Japan Society for the Promotion of Science, 1989), isosorbide and isomannide derivatives can be used.

A chiral agent generally contains an asymmetric carbon atom; however, an axially asymmetric compound or a planarly asymmetric compound, which does not contain an asymmetric carbon atom, can also be used as a chiral agent. Examples of the axially asymmetric compound or planarly asymmetric compound include binaphthyl, helicene, paracyclophane, and derivatives thereof. The chiral agent may have a polymerizable group. In a case in which both the chiral agent and the liquid crystal compound have a polymerizable group, a polymer having a repeating unit derived from the polymerizable liquid crystal compound and a repeating unit derived from the chiral agent can be formed by the polymerization reaction between the polymerizable chiral agent and the polymerizable liquid crystal compound. In this embodiment, it is preferable that the polymerizable group carried by the polymerizable chiral agent is a group of the same kind as the polymerizable group carried by the polymerizable liquid crystal compound. Therefore, the polymerizable group of the chiral agent is preferably an unsaturated polymerizable group, an epoxy group, or an aziridinyl group; more preferably an unsaturated polymerizable group; and particularly preferably an ethylenically unsaturated polymerizable group.

The chiral agent may also be a liquid crystal compound.

In a case in which the chiral agent has a photoisomerization group, it is preferable because a pattern having a desired reflection wavelength corresponding to the wavelength of emitted light can be formed by application, orientation, and then photo mask irradiation with actinic rays. The photoisomerization group is preferably an isomerization site of a compound showing photochromic properties, an azo group, an azoxy group, or a cinnamoyl group. Regarding specific examples of the compound, the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A can be used.

Specific examples of the chiral agent include a compound represented by Formula (12).

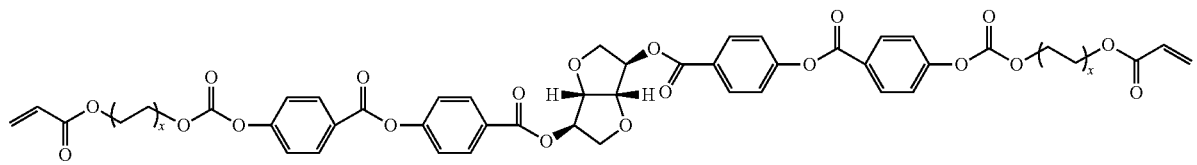

(12)

In the formula, X represents 2 to 5 (integer).

The content of the chiral agent in the liquid crystal composition is preferably 0.01 mol % to 200 mol %, and more preferably 1 mol % to 30 mol %, of the amount of the polymerizable liquid crystalline compound.

—Polymerization Initiator—

In a case in which the liquid crystal composition includes a polymerizable compound, it is preferable that the liquid crystal composition contains a polymerization initiator. In an embodiment of carrying out a polymerization reaction by ultraviolet irradiation, the polymerization initiator used is preferably a photopolymerization initiator capable of initiating a polymerization reaction by ultraviolet irradiation. Examples of the photopolymerization initiator include an α-carbonyl compound (described in U.S. Pat. Nos. 2,367, 661A and 2,367,670A), an acyloin ether (described in U.S. Pat. No. 2,448,828A), an α-hydrocarbon-substituted aromatic acyloin compound (described in U.S. Pat. No. 2,722, 512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and an oxadiazole compound (described in U.S. Pat. No. 4,212, 970A).

The content of the photopolymerization initiator in the liquid crystal composition is preferably 0.1% to 20% by mass, and more preferably 0.5% to 12% by mass, with respect to the content of the polymerizable liquid crystal compound.

—Crosslinking Agent—

The liquid crystal composition may optionally include a crosslinking agent, for the purpose of enhancing the film hardness after curing and enhancing durability. Regarding the crosslinking agent, an agent that cures by means of ultraviolet radiation, heat, moisture, or the like can be suitably used.

The crosslinking agent is not particularly limited and can be selected as appropriate according to the purpose. Examples include polyfunctional acrylate compounds such as trimethylolpropane tri(meth)acrylate and pentaerythritol tri(meth)acrylate; epoxy compounds such as glycidyl (meth) acrylate and ethylene glycol diglycidyl ether; aziridine compounds such as 2,2-bishydroxymethylbutanol tris[3-(1-aziridinyl)propionate] and 4,4-bis (ethyleneiminocarbonylamino)diphenylmethane; isocyanate compounds such as hexamethylene diisocyanate and a biuret type isocyanate; a polyoxazoline compound having an oxazoline group in a side chain; and alkoxysilane compounds such as vinyltrimethoxysilane and N-(2-aminoethyl)-3-aminopropyltrimethoxysilane. A known catalyst can be used according to the reactivity of the crosslinking agent, and thus productivity can be enhanced in addition to the enhancement of film hardness and durability. These may be used singly, or two or more kinds thereof may be used in combination.

The content of the crosslinking agent is preferably 3% to 20% by mass, and more preferably 5% to 15% by mass. In a case in which the content of the crosslinking agent is less than 3% by mass, an effect of enhancing the crosslinking density may not be obtained, and in a case in which the content is more than 20% by mass, the stability of the cholesteric liquid crystal layer may be deteriorated.

—Other Additives—

In a case in which an inkjet method is used as a method for forming the reflective polarizing layer 40 (reflective polarizing element), a monofunctional polymerizable monomer may be used in order to obtain the generally required ink physical properties. Examples of the monofunctional polymerizable monomer include 2-methoxyethyl acrylate, isobutyl acrylate, isooctyl acrylate, isodecyl acrylate, and octyl/decyl acrylate.

In the liquid crystal composition, if necessary, a polymerization inhibitor, an antioxidant, an ultraviolet absorber, a photostabilizer, a coloring material, metal oxide microparticles, and the like can be further added to the extent that the optical performance and the like are not deteriorated.

It is preferable that the liquid crystal composition is used as a liquid in a case in which the reflective polarizing layer 40 is formed.

The liquid crystal composition may include a solvent. The solvent is not particularly limited and can be selected as appropriate according to the purpose; however, an organic solvent is preferably used.

The organic solvent is not particularly limited and can be selected as appropriate according to the purpose. Examples include ketones such as methyl ethyl ketone and methyl isobutyl ketone; alkyl halides; amides; sulfoxides; heterocyclic compounds; hydrocarbons; esters; and ethers. These may be used singly, or two or more kinds thereof may be used in combination. Among these, in consideration of the burden on the environment, ketones are particularly preferred. The above-mentioned components such as the monofunctional polymerizable monomer may also function as a solvent.

The liquid crystal composition is applied on the support 38, dried, and then cured, and thus the reflective polarizing layer 40 is formed.

Application of the liquid crystal composition may be carried out using a known applicator device such as a bar coater such as a wire bar coater, a die coater, a wire coater, a spin coater, or a doctor blade.

As described below, in a case in which a reflective polarizing layer is formed on convex-shaped reflective polarizing elements separated apart from one another or only on an inclined surface, a printing method can be suitably utilized. The printing method is not particularly limited, an inkjet method, a gravure printing method, a flexographic printing method, and the like can be used.

As will be described below, in the case of a reflective polarizing element having a plurality of regions that reflect light of different wavelength ranges in one reflective polarizing element, first, a liquid crystal composition that becomes the layer on the support 38 side is applied and cured to form a first layer, subsequently a liquid crystal composition that becomes a second layer is applied and cured on the first layer to form a second layer, and a third layer and more layers are also formed by the same method. Thereby, a reflective polarizing layer 40 having a plurality of regions having different wavelength ranges of the light to be reflected or having different directions of polarization can be formed.

The liquid crystal composition applied on the support 38 is dried or heated as necessary, and then the liquid crystal composition is cured. It is desirable that the polymerizable liquid crystal compound in the liquid crystal composition is oriented in the process of drying or heating. In the case of performing heating, the heating temperature is preferably 200° C. or lower, and more preferably 130° C. or lower.

The liquid crystal compound thus oriented may be further polymerized. The polymerization may be any of thermal polymerization and photopolymerization by light irradiation; however, photopolymerization is preferred. Regarding the light irradiation, it is preferable to use ultraviolet radiation. The energy of irradiation is preferably 20 to 50 J/cm$^2$, and more preferably 10 to 1,500 mJ/cm$^2$. In order to accelerate the photopolymerization reaction, light irradiation may be performed under heating conditions or in a nitrogen atmosphere. The wavelength of the ultraviolet radiation emitted is preferably 250 to 430 nm. The polymerization reaction ratio is preferably higher from the viewpoint of stability, and the polymerization reaction ratio is preferably 70% or higher, and more preferably 80% or higher.

The polymerization reaction ratio can be determined by determining the consumption ratio of polymerizable functional groups using the IR (infrared) absorption spectrum.

In regard to the R-layer 30R, G-layer 30G, and B-layer 30B, the forming materials and/or thicknesses of the reflective polarizing layers 40 may be identical with or different from each other.

As described above, in regard to the R-layer 30R, G-layer 30G, and B-layer 30B that constitute the optical film 16 of the backlight unit 10, the R-polarizing element 34R, the G-polarizing element 34G, and the B-polarizing element 34B each comprises convexities 38a of the support 38; and a reflective polarizing layer 40 on these convexities 38a.

The support 38 is a sheet-like object having a surface that is parallel to the direction of light propagation by the light guide plate 14. In other words, the support 38 is a sheet-like object having a surface that is parallel to the light exiting surface of the light guide plate 14. That is, the support 38 has a surface that is parallel to the direction of light propagation by the light guide plate 14.

The support 38 has a large number of convexities 38a on the surface on the light guide plate 14 side. A convexity 38a has a right-angled triangle-shaped cross-section and is formed such that the surface adjoining the right angle comes on the surface side of the support 38. The convexity 38a is formed such that the surface that does not adjoin the right angle faces toward a direction in which the plane is separating apart from the light source 12, and gradually approaches the light guide plate 14. That is, each of the convexities 38a of the support 38 has an inclined surface that is inclined with respect to the direction of light propagation by the light guide plate 14, the inclined surface facing a direction in which the inclined surface is separating apart from the light source 12, and gradually approaching the light guide plate 14.

The reflective polarizing layer 40 is a layer-like object having a uniform thickness, which is formed on the surface of the support 38. That is, the reflective polarizing layer 40 has the same surface shape as that of the support 38.

Therefore, each of the R-polarizing element 34R, the G-polarizing element 34G, and the B-polarizing element 34B comprising such convexities 38a and a reflective polarizing layer 40 formed in a layer form on the convexities 38a, has an inclined surface that is inclined with respect to the direction of light propagation by the light guide plate 14, the inclined surface facing toward a direction in which the inclined surface is separating apart from the light source 12, and gradually approaching the light guide plate 14.

In addition, the reflective polarizing layer 40 of the R-polarizing element 34R reflects red right-hand circularly polarized light Lr, and transmits the other portion of light including red left-hand circularly polarized light Ll. The reflective polarizing layer 40 of the G-polarizing element 34G reflects green right-hand circularly polarized light Lr and transmits the other portion of light including green left-hand circularly polarized light Ll. The reflective polarizing layer 40 of the B-polarizing element 34B reflects blue right-hand circularly polarized light Lr and transmits the other portion of light including blue left-hand circularly polarized light Ll.

Therefore, in the light incident to the optical film 16 from the light guide plate 14, right-hand circularly polarized light Lr is reflected respectively by the R-polarizing element 34R, G-polarizing element 34G, and B-polarizing element 34B in the R-layer 30R, G-layer 30G, and B-layer 30B to the light guide plate 14 side, and the reflected light exits from the light guide plate and is incident to the λ/4 plate 18. On the other hand, left-hand circularly polarized light Ll returns from the optical film 16 to the light guide plate 14 and repeatedly undergoes total reflection within the light guide plate 14 and incidence into the optical film 16.

In this regard, a detailed description will be given later.

In regard to the R-polarizing element 34R, the G-polarizing element 34G, and the B-polarizing element 34B, the angle θ of the inclined surface may be set as appropriate in accordance with the light irradiation characteristics of the light source 12, the thickness of the light guide plate 14, the thickness of the optical film 16, the thicknesses of the R-layer 30R, the G-layer 30G, and the B-layer 30B, and the like, by selecting an angle at which the light reflected at the inclined surface is directed to orthogonally intersect the light exiting surface 14a of the light guide plate 14.

According to the investigation of the inventors of the present invention, the angle θ of the inclined surface is preferably 10° to 60°, more preferably 20° to 50°, and even more preferably 35° to 45°.

The angle θ of the inclined surface is the angle formed by the direction of light propagation of the light guide plate 14, that is, the exiting surface of the light guide plate 14, and the plane on the support 38 side at the inclined surface of the R-polarizing element 34R or the like.

Regarding the R-polarizing element 34R, the G-polarizing element 34G, and the B-polarizing element 34B, the angles θ of the inclined surfaces may be identical with or different from each other.

In regard to the R-layer 30R, the angle θ of the inclined surface of the R-polarizing element 34R may be all uniform, or two kinds or three or more kinds having different angles θ of the inclined surfaces may exist in mixture. In this regard, the same applies to the G-layer 30G and the B-layer 30B.

Such a support 38 having convexities 38a, and the layer-like reflective polarizing layer 40 conforming to the surface shape of the support 38 can be formed by a known method such as, for example, a method of producing a support 38 having convexities 38a, applying a liquid crystal composition as described above on the surface of the support 38, drying and curing the liquid crystal composition.

As an example of a preferred production method in addition to this, there is mentioned a method of forming by so-called embossing processing, by forming a reflective polarizing layer on a planar-shaped support according to a known method such as a coating method or a printing method, subsequently pressing a mold while heating the support and the reflective polarizing layer, and thereby molding the support 38 and the reflective polarizing layer 40 into a shape corresponding to the that of the mold.

On the reflective polarizing layer 40, an overcoat 42 is formed.

It is acceptable as long as the overcoat is provided on the side of the surface where the reflective polarizing layer 40 of the support 38 is formed, and it is preferable that the overcoat flattens the surface of the R-layer 30R (G-layer 30G or B-layer 30B).

The overcoat 42 is not particularly limited; however, it is more preferable as the difference between the refractive indices of the overcoat 42 and the reflective polarizing layer 40 is smaller, and the difference in the refractive index is preferably 0.04 or less. For example, since the refractive index of the reflective polarizing layer 40 formed from a liquid crystal material is about 1.6, it is preferable that the overcoat 42 is a resin layer having a refractive index of about 1.4 to 1.8. By using an overcoat 42 having a refractive index that is closer to the refractive index of the reflective polarizing layer 40, the angle (polar angle) in a direction in which light incident to the reflective polarizing layer 40 will orthogonally intersect the reflective polarizing layer surface, can be made smaller. Therefore, it is possible to extend the range of the polar angle of light at which the R-layer 30R exhibits retroreflective ability, by using the overcoat 42, and even with a reflective polarizing layer 40 for which the angle that is formed by the support 38 and the surface of the reflective polarizing layer 40 on the opposite side of the support 38 is small, high retroreflective ability can be obtained in a wider range.

It is preferable that the support 38 also has a small difference between the refractive indices of the overcoat 42 and the reflective polarizing layer 40.

The overcoat 42 may also have a function as an antireflection layer, a pressure sensitive adhesive layer, or an adhesive layer.

An example of the overcoat 42 may be a resin layer obtainable by applying a composition including a monomer on the surface of the reflective polarizing layer 40 and then curing the coating film.

The resin is not particularly limited, and may be selected in consideration of the adhesiveness to the support 38 or the liquid crystal material that forms the reflective polarizing layer 40, or the like. For example, a thermoplastic resin, a thermosetting resin, or an ultraviolet-curable resin can be used. In view of durability, solvent resistance, and the like, a resin of the type that is cured by crosslinking is preferred, and particularly, an ultraviolet-curable resin capable of being cured in a short time period is preferred. Examples of the monomer that can be used for forming the overcoat 42 include ethyl (meth)acrylate, ethylhexyl (meth)acrylate, styrene, methylstyrene, N-vinylpyrrolidone, polymethylolpropane tri(meth)acrylate, hexanediol (meth)acrylate, tripropylene glycol di(meth)acrylate, diethylene glycol di(meth) acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat 42 is not particularly limited and may be determined in consideration of the maximum height of the reflective polarizing layer 40. The thickness may be about 5 to 100 μm, preferably 10 to 50 μm, and more preferably 20 to 40 μm. The thickness of the overcoat 42 is the distance from the reflective polarizing layer 40-forming surface of the support 38 at an area where there is no reflective polarizing layer 40, to the surface of the overcoat present at the facing surface.

In regard to the R-layer 30R, the G-layer 30G, and the B-layer 30B, the forming materials and/or thicknesses of the overcoats 42 may be identical with or different from each other.

In regard to the optical film 16, the R-layer 30R, G-layer 30G, and B-layer 30B are laminated and adhered by an adhesive suitable for the materials forming the overcoat 42 and the support 38. The optical film 16 is adhered to the light guide plate 14 by means of an adhesive suitable for the materials forming the overcoat 42 of the R-layer 30R and the light guide plate 14. Alternatively, as described above, the overcoat 42 may also function as an adhesive.

Regarding the adhesive, an adhesive having sufficient light transmittance is used.

In the following description, the action of the backlight unit 10 will be explained.

Light emitted from the light source 12 is incident to the light guide plate 14 through the light incident surface 14b and propagates through the light guide plate 14. In the light incident to the light guide plate 14 and propagated therethrough, a portion of light is incident to the optical film 16 that is closely adhered to a surface of the light guide plate 14, the surface being on the opposite side of the light exiting surface 14a.

In the light incident to the optical film 16, the R right-hand circularly polarized light Lr incident to the R-layer 30R is reflected by the reflective polarizing layer 40, and the R left-hand circularly polarized light Ll, the G light, and the B light are transmitted through the reflective polarizing layer 40. Here, the R right-hand circularly polarized light Lr incident to the R-polarizing element 34R of the R-layer 30R is reflected toward the light guide plate 14 by the R-polarizing element 34R having an inclined surface.

Furthermore, the G right-hand circularly polarized light Lr incident to the G-layer 30G is reflected by the reflective polarizing layer 40, and the G left-hand circularly polarized light Ll, the R light, and the B light are transmitted by the reflective polarizing layer 40. Here, the G right-hand circularly polarized light Lr incident to the G-polarizing element 34G of the G-layer 30G is reflected toward the light guide plate 14 by the G-polarizing element 34G having an inclined surface.

The B right-hand circularly polarized light Lr incident to the B-layer 30B is reflected by the reflective polarizing layer 40, and the B left-hand circularly polarized light Ll, the red light, and the green light are transmitted by the reflective polarizing layer 40. Here, the B right-hand circularly polarized light Lr incident to the B-polarizing element 34B of the B-layer 30B is reflected toward the light guide plate 14 by the B-polarizing element 34B having an inclined surface.

The right-hand circularly polarized light Lr of R, G and B reflected by the R-polarizing element 34R, the G-polarizing element 34G, and the B-polarizing element 34B is incident to the light guide plate 14 and exits through the light exiting surface 14a, and this light is converted to linearly polarized light in a predetermined direction by the λ/4 plate 18 and is incident to the backlight side polarizing plate 26.

Here, since the light incident to the backlight side polarizing plate 26 is linearly polarized light converted by the backlight side polarizing plate 26, most of the incident light is incident to the liquid crystal panel disposed on the downstream side in the travel direction, without being absorbed by the backlight side polarizing plate 26.

Meanwhile, the left-hand circularly polarized light Ll and the light that is not incident to the R-polarizing element 34R, the G-polarizing element 34G, and the B-polarizing element 34B are reflected by the reflective polarizing layer 40, the reflector plate 24, and the like and are incident to the light guide plate 14.

In the light guide plate 14, light undergoes repeated total reflection, and repeatedly undergoes switching between the left-hand circularly polarized light Ll and the right-hand circularly polarized light Lr as a result of reflection. Then, the light is incident to the optical film 16 again.

In the light incident to the optical film 16, similarly to the previous case, only the right-hand circularly polarized light Lr incident to the R-polarizing element 34R, the G-polarizing element 34G, and the B-polarizing element 34B is reflected toward the light guide plate 14 and exits through the light exiting surface 14a of the light guide plate 14.

The left-hand circularly polarized light Ll and the like of the remaining portion is incident to the light guide plate 14, undergoes repeated total reflection within the light guide plate 14, and is repeatedly incident to the optical film 16 again.

As described above, in the backlight unit 10 of the invention, the light exiting through the light exiting surface 14a of the light guide plate 14 is always circularly polarized light in a constant direction. Therefore, as the light is converted to linearly polarized light in a predetermined direction by the λ/4 plate 18 and then is caused to be incident to the backlight side polarizing plate 26, the light absorbed by the backlight side polarizing plate 26 can be mostly eliminated. Thus, the efficiency of utilization of the light exiting from the light guide plate 14 can be increased to a large extent.

Furthermore, since total reflection of light inside the light guide plate 14 is achieved with a reflectance of 1, in principle, there is no energy loss due to reflection, and the efficiency of utilization of the light emitted by the light source 12 can also be increased to a large extent.

The optical film of the backlight unit 10 illustrated in FIG. 1 has an R-layer 30R coping with red light, a G-layer 30G coping with green light, and a B-layer 30B coping with blue light; however, in addition to this, various configurations can be utilized in the invention.

Figure 3A:
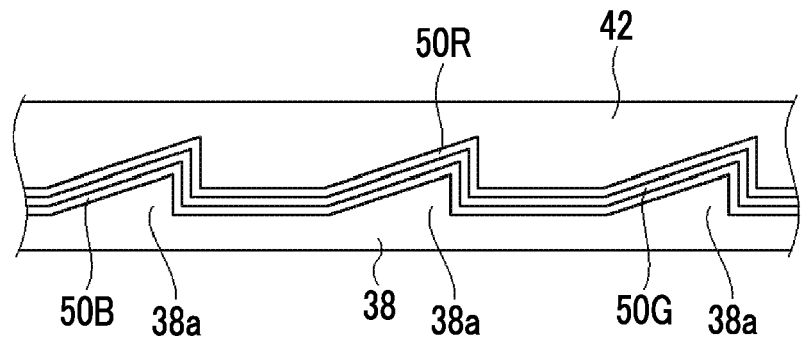
FIG. 3A and FIG. 3B are conceptual diagrams for explaining other examples of the reflective polarizing element in the backlight unit of the invention.

For example, instead of the optical film having a three-layer configuration having the R-layer 30R, the G-layer 30G, and the B-layer 30B, as conceptually illustrated in FIG. 3A, the optical film may also have a one-layer configuration in which an R-polarizing layer 50R that reflects R right-hand circularly polarized light, a G-polarizing layer 50G that reflects G right-hand circularly polarized light, and a B-polarizing layer 50B that reflects B right-hand circularly polarized light, are laminated on a support 38 having convexities 38a.

Also in the example illustrated in FIG. 3A, a R-polarizing element, a G-polarizing element, and a B-polarizing element are provided at different positions on the optical film 16 in a direction that orthogonally intersects the surface direction of the light guide plate 14.

Figure 3B:
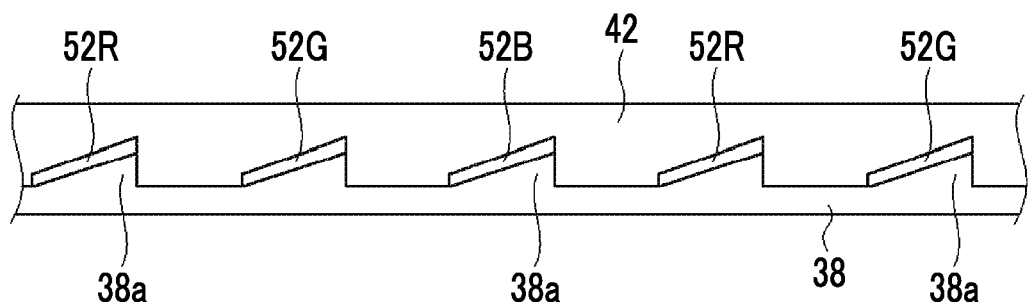

Alternatively, as conceptually illustrated in FIG. 3B, an optical film having a one-layer configuration in which any one of an R-polarizing layer 52R that reflects R right-hand circularly polarized light, a G-polarizing layer 52G that reflects G right-hand circularly polarized light, and a B polarizing layer 52B that reflects B right-hand circularly polarized light is provided on a support 38 having a plurality of convexities 38a, on the inclined surfaces of the convexities 38a, can also be utilized.

That is, in the example illustrated in FIG. 3B, the R-polarizing element, the G-polarizing element, and the B-polarizing element are arranged to be separated apart in the surface direction of the optical film. In this configuration, the R-polarizing element, the G-polarizing element, and the B-polarizing element, that is, the convexities 38a, may be provided adjacently in the surface direction of the optical film.

In regard to the backlight unit of the invention, various shapes can be utilized for the shape of the convexity on the support of the optical film.

Figure 4A:
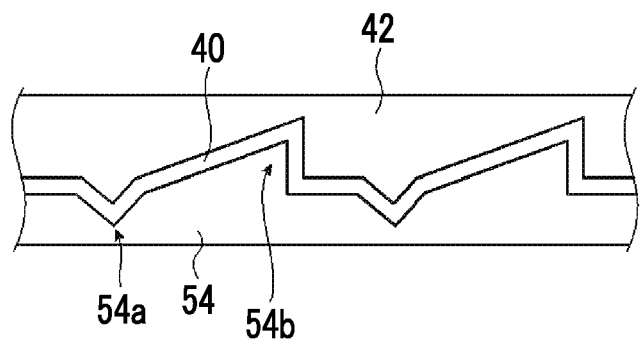
FIG. 4A and FIG. 4B are conceptual diagrams for explaining other examples of the reflective polarizing element in the backlight unit of the invention.

For example, as conceptually illustrated in FIG. 4A, a configuration in which concavities 54a are provided on the support 54, convexities 54b that constitute inclined surfaces are provided successively to these concavities 54a, and a reflective polarizing layer 40 that reflects right-hand circularly polarized light is laminated on this support 54, may also be employed.

Figure 4B:
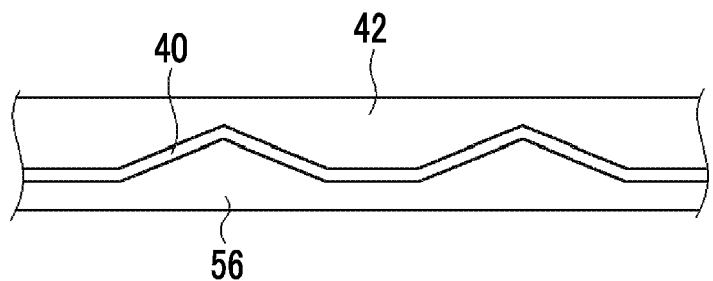

Alternatively, as conceptually illustrated in FIG. 4B, a configuration in which convexities 56a each having an inclined surface are provided on a support 56 such that the convexities face the direction in which the convexities are separated apart from a light source 12 and gradually approach the light guide plate 14, while the inclined surface is gradually separated apart from the light guide plate 14 from a certain apex, and a reflective polarizing layer 40 that reflects right-hand circularly polarized light is laminated on these convexities 56a, may also be employed. This configuration is suitable in a case in which two facing surfaces of the light guide plate 14 are employed as light incident surfaces.

In the above-give examples, a reflective polarizing element having an inclined surface is formed by providing convexities (concavities) on the support; however, the invention is not intended to be limited to this.

Figure 5A:
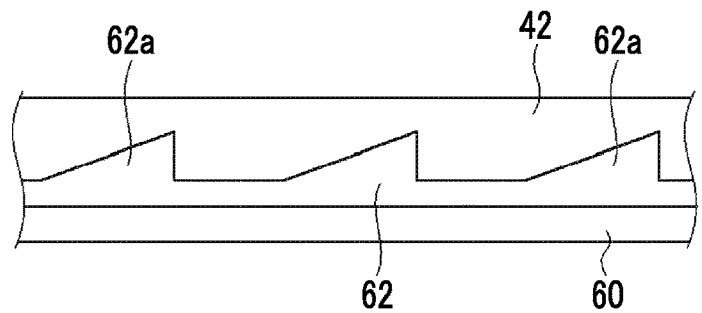
FIG. 5A and FIG. 5B are conceptual diagrams for explaining other examples of the reflective polarizing element in the backlight unit of the invention.

For example, as conceptually illustrated in FIG. 5A, a reflective polarizing layer 62 that reflects right-hand circularly polarized light, which is provided with convexities 62a each having an inclined surface that is inclined with respect to the direction of light propagation in the light guide plate 14, is formed on the surface of a planar-shaped support 60, and these convexities 62a of this reflective polarizing layer 62 may be utilized as reflective polarizing elements.

Such a reflective polarizing layer 62 having convexities 62a can be formed by, for example, a so-called imprinting method, by which a liquid crystal composition that becomes a reflective polarizing layer 62 is applied on the surface of a planar-shaped support 60, drying this liquid crystal composition, and then curing the liquid crystal composition by ultraviolet irradiation while molding the composition with a mold.

Figure 5B:
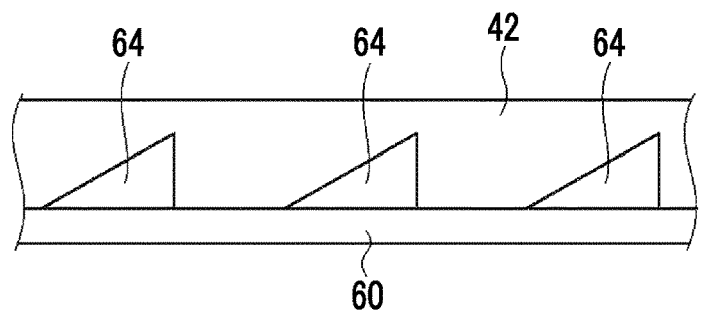

As another example, as conceptually illustrated in FIG. 5B, a large number of reflective polarizing elements 64 that reflect right-hand circularly polarized light may also be formed on the surface of a planar-shaped support 60 separately apart from one another, the reflective polarizing elements having an inclined surface that is inclined with respect to the direction of light propagation of the light guide plate 14. Alternatively, similar reflective polarizing elements 64 may also be formed adjacently on the surface of a planar-shaped support 60.

Such a reflective polarizing element 64 can be formed by filling a mold with a liquid crystal composition that becomes the reflective polarizing element 64 and transferring the liquid crystal composition.

In the example illustrated in FIG. 5B, the optical film may have a three-layer configuration having the R-layer, G-layer, and B-layer illustrated in FIG. 1, or may have a configuration obtained by laminating reflective polarizing layers of R, G, and B illustrated in FIG. 3A, or may have a configuration illustrated in FIG. 3B, in which reflective polarizing elements for red light, green light and blue light are formed separately apart from or adjacently to one another in one layer.

In the backlight unit of the invention, the reflective polarizing element has an inclined surface that is inclined with respect to the direction of light propagation of the light guide plate 14; however, the invention may also be such that the reflective polarizing element has a curved surface instead of such an inclined surface.

Figure 6A:
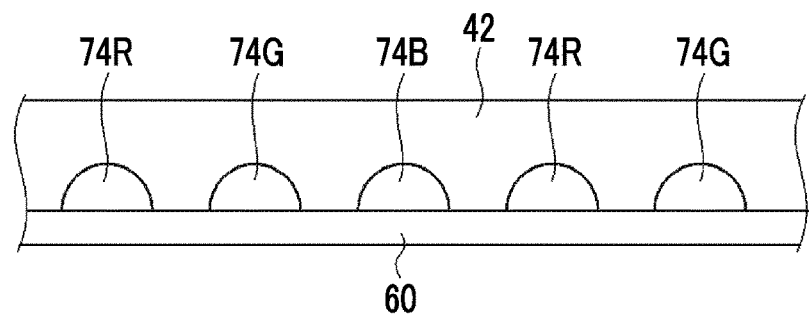
FIG. 6A and FIG. 6B are conceptual diagrams for explaining other examples of the reflective polarizing element in the backlight unit of the invention.

For instance, as conceptually illustrated in FIG. 6A, a configuration in which a large number of R-polarizing elements 72R that reflect R right-hand circularly polarized light, G-polarizing elements 72G that reflect G right-hand circularly polarized light, and B-polarizing elements 72B that reflect B right-hand circularly polarized light, are formed separately apart from one another on a planar-shaped support 60, may also be employed. Alternatively, a large number of reflective polarizing elements for R, G and B, respectively, may also be formed adjacently to one another.

Figure 6B:
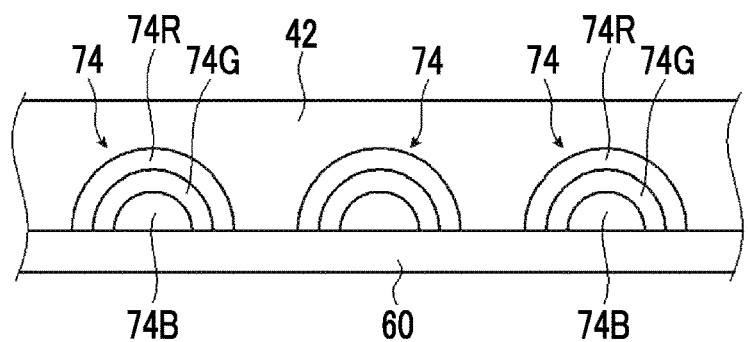

Also, as conceptually illustrated in FIG. 6B, a configuration in which a plurality of reflective polarizing elements 74 are formed separately apart from one another on a planar-shaped support 60, each reflective polarizing element 74 being obtained by laminating a B-polarizing layer 74B that reflects B right-hand circularly polarized light, a G-polarizing layer 74G that reflects G right-hand circularly polarized light, and a R-polarizing layer 74R that reflects R right-hand circularly polarized light, may also be employed. Alternatively, a plurality of reflective polarizing elements 74 may also be formed adjacently to one another.

In the example illustrated in FIG. 6A, a backlight unit having a three-layer configuration in which a reflective polarizing element (layer) coping with only one color is provided on one support, and a R-layer, a G-layer, and a B-layer are provided as in the case of the optical film 16 illustrated in FIG. 1, may also be employed.

Furthermore, in the example illustrated in FIG. 6A and FIG. 6B, reflective polarizing elements are formed on the surface of a planar-shaped support 60; however, also in regard to the reflective polarizing elements having a curved surface as illustrated in FIG. 6A and FIG. 6B, reflective polarizing elements may also be configured by forming convexities on a support, and forming a reflective polarizing layer so as to cover the support or to cover only the convexities, as in the case of the example illustrated in FIG. 1 or FIG. 3A and FIG. 3B.

In regard to such a reflective polarizing element having a curved surface, the curvature of the curved surface of the reflective polarizing element may be set as appropriate such that the circularly polarized light reflected by the reflective polarizing element is directed to orthogonally intersect the light exiting surface 14a of the light guide plate 14.

According to the investigation of the inventors of the present invention, the angle of the tangent at the intersection point with the support 60, that is, at the starting portion from the support 60, is preferably 10° to 70°, and more preferably 20° to 50°.

In regard to the backlight unit of the invention, a reflective polarizing element having an inclined surface as illustrated in FIG. 1 or the like, and a reflective polarizing element having a curved surface as illustrated in FIG. 6A or the like may exist in mixture.

It is also acceptable that a reflective polarizing element having an inclined surface as illustrated in FIG. 1 or the like has a curved surface, for example, as in the case in which the inclined surface is curved.

In regard to the backlight unit of the invention, the arrangement of the reflective polarizing elements such as the R-polarizing element 34R, the G-polarizing element 34G, and the B-polarizing element 34B may be a regular arrangement or an irregular arrangement.

Regarding the reflective polarizing elements, a plurality of island-like reflective polarizing elements may be scattered to be separated apart from one another or to be adjacent to one another, or long reflective polarizing elements may be arranged in a direction that orthogonally intersects the longitudinal direction. For example, by taking FIG. 1 as an example, a R-polarizing element 34R, a G-polarizing element 34G, and a B-polarizing element 34B, which are long in the direction that is perpendicular to the paper plane of FIG. 1, are arranged in a plurality of rows in the horizontal direction in the paper plane of FIG. 1. Meanwhile, these long reflective polarizing elements may also be divided into a plurality of units along the longitudinal direction.

It is also acceptable that long reflective polarizing elements and island-like reflective polarizing elements exist in mixture.

The density of formation of the reflective polarizing elements may be uniform in the surface direction of the light guide plate, or may vary.

Here, the density of formation of the reflective polarizing elements is preferably such that the density of formation is low on the light source 12 side, and the density of formation on the light source 12 side becomes higher as the reflective polarizing elements are separated apart from the light source 12 in the direction of light propagation by the light guide plate 14. By employing such a configuration, the light exiting from the light guide plate 14 can be made uniform in the surface direction.

In the examples given above, the reflective polarizing element of the backlight unit is to reflect circularly polarized light; however, the invention is not intended to be limited to this.

That is, in regard to the backlight unit of the invention, the reflective polarizing element (reflective polarizing layer) may also reflect linearly polarized light. That is, the reflective polarizing element may reflect linearly polarized light that is parallel to the transmission axis and transmit linearly polarized light that orthogonally intersects the transmission axis, or the reflective polarizing element may reflect linearly polarized light that orthogonally intersects the transmission axis and transmit linearly polarized light that is parallel to the transmission axis.

In the case of reflecting linearly polarized light, a $\lambda/2$ plate may be incorporated instead of the $\lambda/4$ plate 18 as necessary, or the $\lambda/4$ plate 18 may be excluded.

Regarding such a reflective polarizing element that reflects linearly polarized light, various known polarizing elements can be utilized. For instance, a reflective polarizing element (reflective polarizing layer) formed from a multilayer dielectric film may be used.

An example of the multilayer dielectric film is a dielectric film that exhibits a reflectance peak having a central reflection wavelength in the red light, a reflectance peak having a central reflection wavelength in the green light, and a reflectance peak having a central reflection wavelength in the blue light.

Regarding such a multilayer dielectric film, various known films can be utilized. For instance, examples include the multilayer dielectric films described in each patent publication of JP3187821B, JP3704364B, JP4037835B, JP4091978B, JP3709402B, JP4860729B, and JP3448626B.

A multilayer dielectric film is also referred to as a dielectric multilayer reflection polarizing plate or a birefringent interference polarizing element of an alternating multilayer film.

In regard to the backlight unit of the invention, in a case in which the reflective polarizing element reflects linearly polarized light, it is preferable to provide a $\lambda/4$ plate at least in a portion between the light guide plate 14 and the reflector plate 20 provided at an edge face of the light guide plate 14. Thereby, desired linearly polarized light can be obtained by reflection of light by the reflector plate 20, and the efficiency of light utilization can be increased.

Thus, the backlight unit of the invention has been explained in detail; however, the invention is not intended to be limited to the examples described above, and various improvements and modifications may be carried out to the extent that the gist of the invention is maintained.

EXAMPLES

Hereinafter, features of the invention will be described more specifically by way of Examples. The materials, reagents, amounts of use, amounts of materials, proportions, treatments, treatment procedures, and the like disclosed in the following Examples can be modified as appropriate, as long as the purport of the invention is achieved. Therefore, the scope of the invention is not construed to be limited by the specific examples given below.

<Production of Protective Film 01>

A composition as described below was introduced into a mixing tank, and the various components were dissolved by heating and stirring the composition. Thus, a cellulose acetate solution was prepared.

(Composition of Cellulose Acetate Solution)

| | |
|---|---|
| Cellulose acetate having an acetylation degree of 60.7% to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

16 parts by mass of a retardation elevating agent (A) described below, 92 parts by mass of methylene chloride, and 8 parts by mass of methanol were introduced into another mixing tank, and a retardation elevating agent solution was prepared by heating and stirring the mixture. 474 parts by mass of the cellulose acetate solution was mixed with 25 parts by mass of the retardation elevating agent solution, and the mixture was sufficiently stirred. Thus, a dope was prepared. The amount of addition of the retardation elevating agent was 6 parts by mass with respect to 100 parts by mass of cellulose acetate.

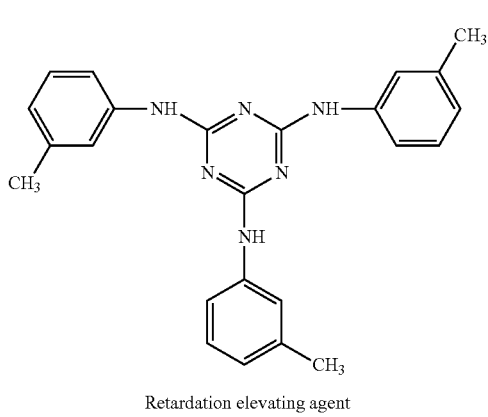

Retardation elevating agent

The dope thus obtained was cast using a band stretching machine. After the film surface temperature reached 40° on the band, the dope was dried by blowing hot air at 70° C. for one minute, and then the film was detached from the band. The detached film was dried by blowing dry air at 140° C. for 10 minutes, and thus a triacetyl cellulose film having a residual solvent amount of 0.3% by mass was produced.

This film was used as protective film 01.

<Production of λ/4 Plate>

A λ/4 plate was produced by using protective film 01 as a substrate and forming an oriented film and an optically anisotropic layer thereon. The details are as follows.

<<Alkali Saponification Treatment>>

Protective film 01 was passed between dielectric heating rolls at a temperature of 60° C., the film surface temperature was increased to 40° C., and then an alkali solution having the composition as described below was applied on one surface of the film using a bar coater in a coating amount of 14 ml/m². The coated protective film was conveyed for 10 seconds under a steam type far-infrared heater manufactured by Noritake Co., Ltd., which was heated to 110° C. Subsequently, 3 ml/m² of pure water was applied using the same bar coater. Next, washing with water using a fountain coater and dehydration using an air knife were repeated three times, and then the protective film was dried by conveying the film for 10 seconds through a drying zone at 70° C. Thus, an alkali saponification-treated protective film 01 (cellulose acylate film) was produced.

(Composition of Alkali Solution)

| | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O\,(CH_2CH_2O)_{20}H$ | 1.0 part by mass |
| Propylene glycol | 14.8 parts by mass |

<<Formation of Oriented Film>>

On a long protective film 01 that had been treated by alkali saponification as described above, an oriented film coating liquid having the following composition was continuously applied with a #14 wire bar. The coating liquid was dried by blowing hot air at 60° C. for 60 seconds, and by blowing hot air at 100° C. for 120 seconds.

(Composition of Oriented Film Coating Liquid)

| | |
|---|---|
| Modified polyvinyl alcohol described below | 10 parts by mass |
| Water | 371 parts by mass |
| Methanol | 119 parts by mass |
| Glutaraldehyde | 0.5 parts by mass |
| Photopolymerization initiator (IRGACURE 2959, manufactured by Ciba Japan K. K.) | 0.3 parts by mass |

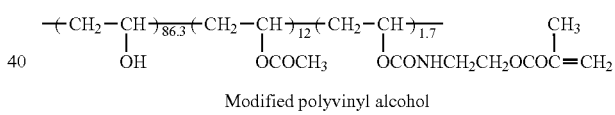

Modified polyvinyl alcohol

<<Formation of Optically Anisotropic Layer Containing Discotic Liquid-Crystal Compound>>

The oriented film thus produced was continuously subjected to a rubbing treatment. At this time, the longitudinal direction of the long film and the direction of conveyance were parallel to each other, and the axis of rotation of the rubber roller was set to a clockwise direction at 45° with respect to the longitudinal direction of the film.

An optically anisotropic layer coating liquid (A) containing a discotic liquid crystal compound, which had the following composition, was continuously applied on the oriented film formed as described above, using a #2.7 wire bar. The speed of conveyance (V) of the film was set to 36 m/min. For the purpose of drying of the solvent of the coating liquid and aging of the orientation of the discotic liquid crystal compound, the coating liquid was heated by blowing hot air at 80° C. for 90 seconds. Subsequently, the oriented film was maintained at 80° C. and was irradiated with UV, and thus the orientation of the liquid crystal compound was fixed. Thus, an optically anisotropic layer was formed, and a λ/4 plate was obtained.

The retardation Re at 550 nm and the retardation in the thickness direction, Rth, of the λ/4 plate were 130 nm and −5 nm, respectively.

(Composition of Optically Anisotropic Layer Coating Liquid (A))

| | |
|---|---|
| Discotic liquid crystal compound described below | 100 parts by mass |
| Photopolymerization initiator (IRGACURE 907, manufactured by Ciba Japan K. K.) | 3 parts by mass |
| Sensitizer (KAYACURE DETX, manufactured by Nippon Kayaku Co., Ltd.) | 1 part by mass |
| Pyridinium salt described below | 1 part by mass |
| Fluorine-based polymer (FP1) described below | 0.4 parts by mass |
| Methyl ethyl ketone | 252 parts by mass |

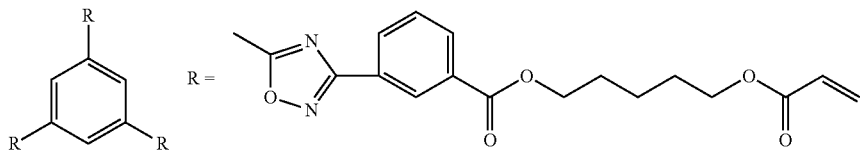

Discotic liquid crystal compound

Pyridinium salt

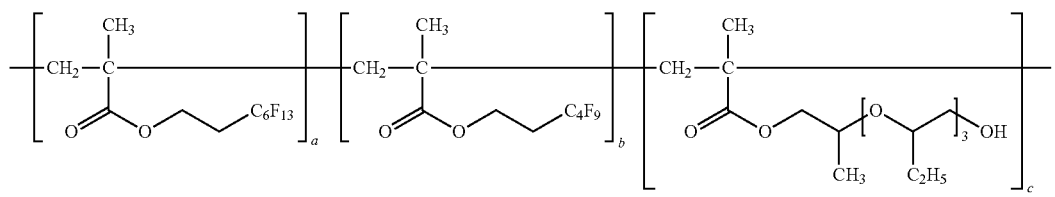

Fluorine-based polymer (FP$_1$)
a/b/c = 20/20/60 wt %
Mw = 16,000

<Production of Polarizing Film>
A rolled polyvinyl alcohol film having a thickness of 80 μm was continuously stretched 5 times in an aqueous solution of iodine and dried, and thus a polarizing film having a thickness of 20 μm was obtained.

<Production of λ/4 Plate-Attached Polarizing Plate 01>
The alkali saponification-treated protective film 01 was bonded to one surface of the polarizing film thus produced, and the λ/4 plate was bonded to the other surface, using a 3 mass % aqueous solution of polyvinyl alcohol (PVA-117H manufactured by Kuraray Co., Ltd.) as an adhesive, such that the support side would come to the polarizing film side. Thus, a λ/4 plate-attached polarizing plate 01 was produced.

<Production of Polarizing Plate>
A polarizing plate 02 was produced in the same manner as in the case of the λ/4 plate-attached polarizing plate 01, except that the alkali saponification-treated protective film 01 was used instead of the λ/4 plate.

Example 1

<Production of Oriented Film>
An oriented film coating liquid having the following composition was applied in an amount of 28 mL/m² on the protective film 01 using a #16 wire bar coater. The coating liquid was dried by blowing hot air at 60° C. for 60 seconds, and by blowing hot air at 90° C. for 150 seconds. The film surface thus formed was subjected to a rubbing treatment by rotating the film surface with a rubbing roll at a rate of 1,000 rotations/min in a direction parallel to the direction of conveyance, and thus an oriented film was produced.

(Composition of Oriented Film Coating Liquid)

| | |
|---|---|
| Modified polyvinyl alcohol described below | 10 parts by mass |
| Water | 370 parts by mass |

-continued

| | |
|---|---|
| Methanol | 120 parts by mass |
| Glutaraldehyde (crosslinking agent) | 0.5 parts by mass |

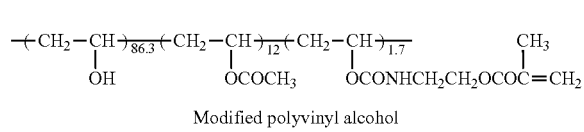

Modified polyvinyl alcohol

<Production of Reflective Polarizing Plate Serving as B-Layer>
Cholesteric liquid crystal liquid 1 described below was stirred and dissolved in a vessel that had been maintained at 25° C., and thus cholesteric liquid crystal ink 1 was prepared.

(Cholesteric Liquid Crystal Liquid 1)

| | |
|---|---|
| Methoxyethyl acrylate | 145 parts by mass |
| Mixture of rod-shaped liquid crystal compounds described below | 100 parts by mass |
| IRGACURE 819 (manufactured by BASF SE) | 10 parts by mass |

| | |
|---|---|
| Chiral agent A having the following structure | 5.78 parts by mass |
| Surfactant having the following structure | 0.08 parts by mass |

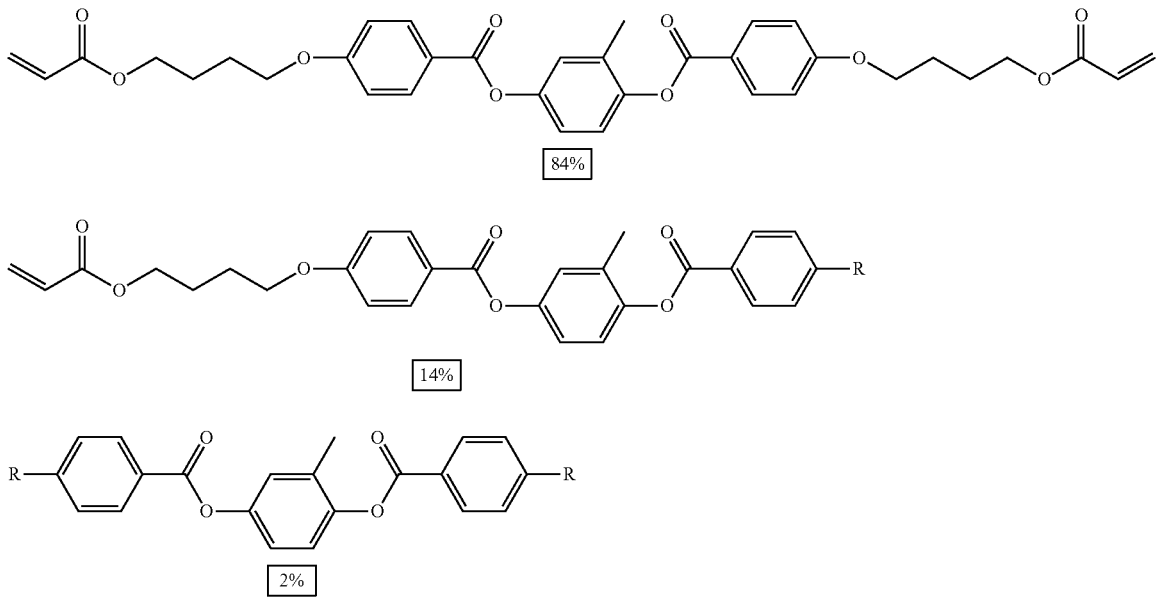

Mixture of rod-shaped liquid crystal compounds

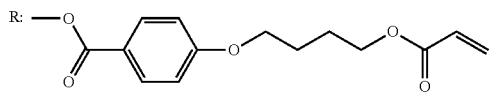

The numerical values are percentages by mass (mass %). R represents a group that is bonded with an oxygen atom.

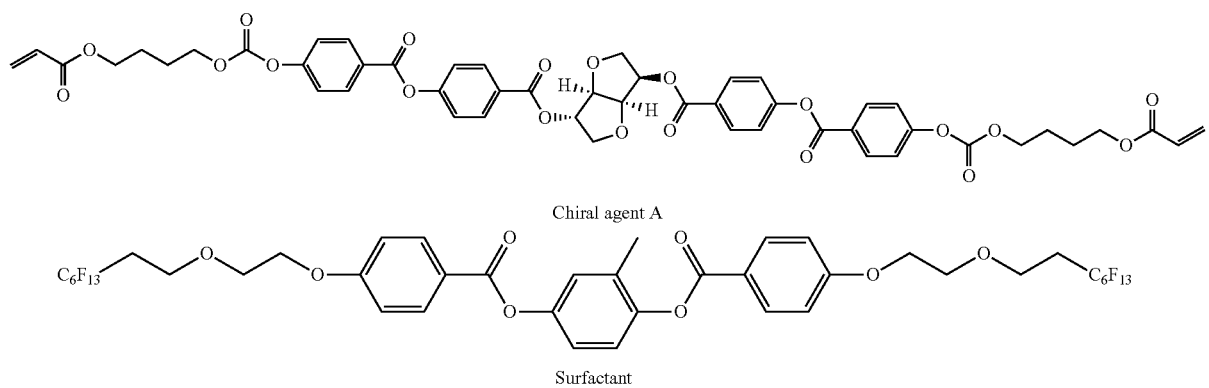

Chiral agent A

Surfactant

The cholesteric liquid crystal liquid 1 thus prepared was applied on the oriented film of the protective film 01 having an oriented film formed thereon, in an amount of 28 mL/m² using a #8 wire bar coater. After the liquid was dried for 30 seconds at 95° C., the applied liquid was irradiated with ultraviolet radiation at a dose of 500 mJ/cm² using an ultraviolet irradiation apparatus, and thus reflective polarizing plate 01 that would become a B-layer was produced.

<Production of Reflective Polarizing Plate Serving as G-Layer>

Cholesteric liquid crystal liquid 2 was produced in the same manner as in the case of cholesteric liquid crystal liquid 1, except that the amount of addition of the chiral agent was changed to 5.1 parts by mass.

Reflective polarizing plate 02 that would become a G-layer was produced in the same manner as in the case of reflective polarizing plate 01, except that this cholesteric liquid crystal liquid 2 was used.

<Production of Reflective Polarizing Plate Serving as R-Layer>

Cholesteric liquid crystal liquid 3 was produced in the same manner as in the case of cholesteric liquid crystal liquid 1, except that the amount of addition of the chiral agent was changed to 4.4 parts by mass.

Reflective polarizing plate 03 that would become an R-layer was produced in the same manner as in the case of reflective polarizing plate 01, except that this cholesteric liquid crystal liquid 3 was used.

<Production of Reflective Polarizing Element Having Convexities and Inclined Surface (Embossing Processing)>

Each of the reflective polarizing plates 01, 02 and 03 thus produced was heated such that the film surface temperature of the liquid crystal layer reached 180° C., and subsequently, a mold (made of nickel) having a plurality of saw-tooth-shaped, right-angled triangle shapes in an irregular manner was pressed thereon for 30 minutes to transfer the shapes. The embossing-processed reflective polarizing plates were designated as reflective polarizing plates 011, 021, and 031, respectively.

The angle (inclination) formed by the right-angled triangle of the mold used and a plane, that is, the angle θ of the inclined surface of the reflective polarizing element, was set to 40° C.

<Formation of Overcoat>

A composition described below was stirred and dissolved in a vessel that had been maintained at 25° C., and thus a coating liquid for overcoat was prepared.

(Coating Liquid for Overcoat)

| | |
|---|---|
| Acetone | 100 parts by mass |
| KAYARAD DPCA-30 (manufactured by Nippon Kayaku Co., Ltd.) | 30 parts by mass |
| EA-200 (manufactured by Osaka Gas Chemicals Co., Ltd.) | 70 parts by mass |
| IRGACURE 819 (manufactured by BASF SE) | 3 parts by mass |

The coating liquid for overcoat thus prepared was applied on the liquid crystal layer of each of the embossing-processed reflective polarizing plates 011, 021, and 031, using a #15 bar coater.

Subsequently, the coating liquid was heated such that the film surface temperature reached 50° C., and the coating liquid was dried for 60 seconds. Subsequently, the dried coating liquid was irradiated with ultraviolet radiation at a dose of 500 mJ/cm$^2$ using an ultraviolet irradiation apparatus, a crosslinking reaction was caused to proceed, and thus an overcoat was formed. The reflective polarizing plates having an overcoat formed thereon were designated as reflective polarizing plates 012, 022, and 032, respectively.

<Production of Backlight Unit>

The reflective polarizing plates 012, 022, and 032 having an overcoat formed thereon were laminated and bonded using a pressure-sensitive adhesive (manufactured by Soken Chemical & Engineering Co., Ltd.), and thus an optical film composed of three layers as illustrated in FIG. 1 was produced. At this time, each of the reflective polarizing plates was arranged such that the right-angled triangle-shaped convexities would face the same direction as illustrated in FIG. 1.

This optical film was bonded to an acrylic plate (manufactured by Hikari Co., Ltd.) as a light guide plate, using the same pressure-sensitive adhesive. The optical film was bonded such that the overcoat faced the acrylic plate side.

On a surface of the acrylic plate, the surface being on the opposite side of the optical film, the λ/4 plate-attached polarizing plate 01 was disposed such that the λ/4 plate side faced the acrylic plate. Furthermore, on a surface of the optical film, the surface being on the opposite side of the acrylic plate, a mirror was disposed as a reflector plate.

An aluminum foil tape was adhered to three sides of the acrylic plate, except for the edge face on the opposite side of the right-angle side of the right-angled triangle-shaped convexities arranged thereon, and the three sides were used as reflector plates.

Furthermore, a LED was provided as a light source such that light was incident through the edge face that was not attached with the aluminum foil tape, and thus a backlight unit having a backlight side polarizing plate as illustrated in FIG. 1 was produced.

Example 2

A reflective polarizing plate was produced in the same manner as in Example 1, except that the angle formed by the right-angled triangle of the mold and a plane surface was changed to 50°, that is, the angle θ of the inclined surface of the reflective polarizing element was changed to 50°, and thus a backlight unit was produced.

Example 3

A reflective polarizing plate was produced in the same manner as in Example 1, except that the angle formed by the right-angled triangle of the mold and a plane surface was changed to 30°, that is, the angle θ of the inclined surface of the reflective polarizing element was changed to 30°, and thus a backlight unit was produced.

Example 4

A reflective polarizing plate was produced in the same manner as in Example 1, except that a mold in which the shape of the mold was a right-angled triangle shape, with the vertex angles being arranged head-to-head and the triangles being inverted vertically, the ratio of sides was 1:2, and the angle formed by the right-angled triangle and a plane surface was 20°, was used, and thus a backlight unit was produced. At this time, a right-angled triangle having a long side was disposed on the λ/4 plate-attached polarizing plate 01 side, and a right-angled triangle having a short side was disposed on the reflector plate side.

That is, in this backlight unit, the reflective polarizing element has the shape illustrated in FIG. 4A.

Example 5

A reflective polarizing plate was produced in the same manner as in Example 1, except that a mold in which the shape of the mold was an isosceles right-angled triangle, and the angle formed by the isosceles right-angled triangle and a plane surface was 45°, was used, and thus a backlight unit was produced.

That is, in this backlight unit, the reflective polarizing element has the shape illustrated in FIG. 4B.

Example 6

A reflective polarizing plate was produced in the same manner as in Example 1, except that cholesteric liquid crystal liquid 1 was applied on the oriented film and dried for 30 seconds at 95° C., a mold was mounted thereon, and then the system was irradiated with ultraviolet radiation, and thus a backlight unit was produced.

That is, in this backlight unit, the reflective polarizing element was not embossing processed but was imprinted, and thus, the polarizing element has the shape illustrated in FIG. 5A.

Example 7

A reflective polarizing plate was produced in the same manner as in Example 1, except that a mold having a plurality of angles formed by the right-angled triangle of the mold and a plane surface was used, and the angles were 30°, 40°, and 50°, and thus a backlight unit was produced.

That is, in this backlight unit, the optical film had a configuration in which reflective polarizing elements having angles θ of inclined surfaces of 30°, 40°, and 50° were randomly formed.

Example 8

A reflective polarizing plate was produced in the same manner as in Example 1, except that a mold having a density distribution of the right-angled triangles was used, and thus a backlight unit was produced.

The density of the right-angled triangles was arranged such that the right-angled triangles were sparsely present on the light source side, and the density gradually increased as the measurement site was separated apart from the light source.

Example 9

A reflective polarizing plate in which reflective polarizing elements each having a right-angled triangle-shaped inclined surface were formed, was produced in the same manner as in Example 1, except that in place of the reflective polarizing plates 01, 02, and 03, the reflective polarizing plates attached to the backlight side polarizing plate (reflective polarizing plate reflecting linearly polarized light) of an iPad Air (manufactured by Apple, Inc.) were detached and used in the reflective polarizing plate of this Example. Thus, a backlight unit was produced.

The reflective polarizing plates 01, 02, and 03 are reflective polarizing plates before being processed by embossing. That is, this example is an example in which a reflective polarizing plate was produced by subjecting the reflective polarizing plate detached from an iPad Air, to the treatments subsequent to embossing processing in the same manner as in Example 1.

In the present example, polarizing plate 02 was used instead of the λ/4 plate-attached polarizing plate 01.

Example 10

A reflective polarizing plate in which reflective polarizing elements each having right-angled triangle-shaped inclined surfaces facing each other were formed, was produced in the same manner as in Example 4, except that in place of the reflective polarizing plates 01, 02, and 03, the reflective polarizing plates attached to the backlight side polarizing plate (reflective polarizing plate reflecting linearly polarized light) of an iPad Air (manufactured by Apple, Inc.) were detached and used in the reflective polarizing plate of this Example. Thus, a backlight unit was produced.

In the present example, polarizing plate 02 was used instead of the λ/4 plate-attached polarizing plate 01.

Example 11

A reflective polarizing plate in which reflective polarizing elements each having an isosceles right-angled triangle-shaped inclined surface were formed, was produced in the same manner as in Example 5, except that in place of the reflective polarizing plates 01, 02, and 03, the reflective polarizing plates attached to the backlight side polarizing plate (reflective polarizing plate reflecting linearly polarized light) of an iPad Air (manufactured by Apple, Inc.) were detached and used in the reflective polarizing plate of this Example. Thus, a backlight unit was produced.

In the present example, polarizing plate 02 was used instead of the λ/4 plate-attached polarizing plate 01.

Comparative Example 1

An iPad Air (manufactured by Apple, Inc.) was disassembled, and a set of backlight sheet (a sheet having a diffusion sheet, a prism sheet, a prism sheet, and a diffusion sheet in this order), a light guide plate, and a reflector plate were removed.

A backlight unit was produced by using the light source and the aluminum foil tape used in Example 1, and disposing elements in the same backlight configuration as that of the iPad Air. In the present example, polarizing plate 02 was used instead of the λ/4 plate-attached polarizing plate 01.

That is, this backlight unit had a diffusion sheet, a prism sheet, a prism sheet, and a diffusion sheet in this order between the light guide plate and the polarizing plate 02, without having an optical film.

Comparative Example 2

First, the backlight side polarizing plate of the iPad Air (manufactured by Apple, Inc.) disassembled in Comparative Example 1 was detached. The detached polarizing plate was accompanied with a reflective polarizing plate. Next, the detached polarizing plate was used instead of the polarizing plate 02 in the sample of Comparative Example 1. Except for this, the same procedure as in Comparative Example 1 was employed, and thus a backlight unit was produced.

[Evaluations]

<Measurement of Luminance and Tint>

For the various backlight units, the luminance and tint were measured at a position in the front direction and at a position in the horizontal direction at an angle of 30° with respect to a direction orthogonally intersecting the exiting surface of the light guide plate. A color luminance meter. BM-5 (manufactured by Topcon Technohouse Corporation), was used for the measurement. The horizontal direction means a direction that is parallel to the LED light.

<Measurement of Total Luminous Flux>

For the various backlight units, luminance was measured with EZCONTRAST (manufactured by Eldim S.A.), and the total luminous flux was calculated by considering the luminance measured values measured at every 15° with respect to a direction orthogonally intersecting the exiting surface of the light guide plate and the solid angles.

The measurement results for the measurement of luminance and tint and the measurement of the total luminous flux are presented in Table 1. Here, regarding the front luminance and the inclination luminance, the values calculated relative to the front luminance of Comparative Example 1 taken as 100 are described. Regarding the total luminous flux, the values calculated relative to the total luminous flux of Comparative Example 1 taken as 100 are described.

TABLE 1

| | Luminance and tint | | | | Total luminous flux |
|---|---|---|---|---|---|
| | Front | | 30° inclination | | |
| | Luminance | Tint (x/y) | Luminance | Tint (x/y) | |
| Example 1 | 305 | 0.32/0.30 | 44 | 0.33/0.34 | 197 |
| Example 2 | 250 | 0.32/0.30 | 50 | 0.33/0.31 | 180 |
| Example 3 | 278 | 0.32/0.30 | 49 | 0.33/0.34 | 188 |
| Example 4 | 300 | 0.32/0.32 | 48 | 0.33/0.34 | 195 |
| Example 5 | 180 | 0.32/0.31 | 39 | 0.33/0.34 | 160 |
| Example 6 | 300 | 0.32/0.31 | 43 | 0.33/0.33 | 198 |
| Example 7 | 278 | 0.32/0.31 | 48 | 0.33/0.34 | 197 |
| Example 8 | 304 | 0.32/0.30 | 43 | 0.33/0.34 | 195 |
| Example 9 | 290 | 0.32/0.31 | 42 | 0.33/0.33 | 185 |
| Example 10 | 286 | 0.32/0.31 | 46 | 0.33/0.33 | 186 |
| Example 11 | 172 | 0.32/0.31 | 39 | 0.33/0.33 | 150 |
| Comparative Example 1 | 100 | 0.32/0.31 | 23 | 0.33/0.33 | 100 |
| Comparative Example 2 | 127 | 0.32/0.31 | 38 | 0.33/0.33 | 150 |

As shown in Table 1, the backlight units of the invention that use an optical film having reflective polarizing elements with inclined surfaces, have superior results in all of the luminance in the front direction and at an inclination of 30°, and the total luminous flux, compared to the Comparative Examples, which are backlight units in the related art. Also, the light exiting from the light guide plate passes through the backlight side polarizing plate with high efficiency. Furthermore, it was found that the reflective polarizing elements that reflect circularly polarized light are superior compared to reflective polarizing elements that reflect linearly polarized light.

From the above results, the effects of the invention are obvious.

The invention is useful particularly in the field of manufacture of image display devices such as liquid crystal display devices.

EXPLANATION OF REFERENCES

10: backlight unit
12: light source
14: light guide plate
16: optical film
18: λ/4 plate
20, 24: reflector plate
26: backlight side polarizing plate
30R: R-layer
30G: G-layer
30B: B-layer
34R, 70R, 72R: R-polarizing element
34G, 70G, 72G: G-polarizing element
34B, 70B, 72B: B-polarizing element
38: support
38a: convexity
40, 62: reflective polarizing layer
42: overcoat
50R, 52R, 74R: R-polarizing layer
50G, 52G, 74G: G-polarizing layer
50B, 52B, 74B: B-polarizing layer
64, 74: reflective polarizing element

What is claimed is:

1. A backlight unit comprising:
   a light source;
   a light guide plate that causes the light emitted by the light source to be incident through an edge face and propagates the light incident through the edge face to exit through a light exiting surface which is one of principal surfaces; and
   an optical film disposed on a surface of the light guide plate, the surface being on the opposite principal surface side of the light exiting surface,
   wherein the optical film has at least one of a plurality of reflective polarizing elements having a curved surface, or a plurality of reflective polarizing elements having an inclined surface that is inclined with respect to the direction of light propagation of the light guide plate,
   wherein the reflective polarizing elements reflect circularly polarized light, and the backlight unit has a λ/4 plate in the downstream of the light exit direction of the light exiting surface of the light guide plate, and
   wherein the backlight unit has an R-polarizing element reflecting red light, a G-polarizing element reflecting green light, and a B-polarizing element reflecting blue light, as the reflective polarizing element.

2. The backlight unit according to claim 1, wherein the density of formation of the reflective polarizing elements increases as the reflective polarizing elements are separated apart from the light source in the direction of light propagation of the light guide plate.

3. The backlight unit according to claim 1, wherein the R-polarizing element, the G-polarizing element, and the B-polarizing element are provided at different positions in a direction orthogonally intersecting the surface direction of the light guide plate.

4. The backlight unit according to claim 1, wherein the R-polarizing element, the G-polarizing element, and the B-polarizing element are arranged in the surface direction of the optical film, adjacently to one another or separately apart from one another.

5. The backlight unit according to claim 1,
   wherein the reflective polarizing element has an R-polarizing layer reflecting red light, a G-polarizing layer reflecting green light, and a B-polarizing layer reflecting blue light, and
   the R-polarizing layer, the G-polarizing layer, and the B-polarizing layer are laminated.

6. The backlight unit according to claim 1, wherein the reflective polarizing element has an inclined surface that gradually approaches the light guide plate in a direction in which the inclined surface is separating apart from the light source in the direction of light propagation of the light guide plate.

7. The backlight unit according to claim 1, wherein the reflective polarizing element has a support having a convexity on the surface; and a reflective polarizing layer formed on the surface of the convexity.

8. The backlight unit according to claim 1, wherein the reflective polarizing element has a convex shape formed on the surface of a planar-shaped support.

9. The backlight unit according to claim 1, wherein the reflective polarizing element is a reflective polarizing layer having a convexity formed on the surface of a planar-shaped support.

10. The backlight unit according to claim 1, further comprising: an overcoat covering the reflective polarizing elements.

* * * * *